(12) United States Patent
Kubinec

(10) Patent No.: US 10,226,040 B2
(45) Date of Patent: *Mar. 12, 2019

(54) DECOY

(71) Applicant: Shane Kubinec, Ontario (CA)

(72) Inventor: Shane Kubinec, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,124

(22) Filed: May 22, 2017

(65) Prior Publication Data
US 2017/0280706 A1    Oct. 5, 2017

Related U.S. Application Data

(63) Continuation of application No. 14/475,979, filed on Sep. 3, 2014, now Pat. No. 9,681,657.

(60) Provisional application No. 61/873,896, filed on Sep. 5, 2013.

(51) Int. Cl.
*A01M 31/06* (2006.01)

(52) U.S. Cl.
CPC .................... *A01M 31/06* (2013.01)

(58) Field of Classification Search
CPC ........................................ A01M 31/06
USPC ................... 43/3, 2; 441/23, 24, 26
See application file for complete search history.

(56) References Cited

U.S. PATENT DOCUMENTS

| | | | |
|---|---|---|---|
| 814,097 A * | 3/1906 | Tartsch | A01M 31/06 43/3 |
| 1,789,649 A * | 1/1931 | Gazecki | A01M 31/06 242/385.4 |
| 1,951,429 A * | 3/1934 | Massie | A01M 31/06 43/3 |
| 1,967,902 A * | 7/1934 | Reichel | A01M 31/06 242/375.3 |
| 2,536,736 A * | 1/1951 | Gazalski | A01M 31/06 43/3 |
| 2,539,727 A * | 1/1951 | Clark | A01M 31/06 242/375 |
| 2,917,857 A * | 12/1959 | Muszynski | A01M 31/06 43/3 |
| 3,079,719 A * | 3/1963 | Muszynski | A01M 31/06 43/3 |
| 3,597,778 A | 8/1971 | Castelliz | |
| 3,704,538 A | 12/1972 | Gagnon | |
| 4,056,890 A * | 11/1977 | Dembski | A01M 31/06 43/3 |
| 4,340,192 A | 7/1982 | Burris, III | |
| 4,674,219 A | 6/1987 | Chargo et al. | |
| 4,757,630 A | 7/1988 | Torberg | |
| 4,781,636 A * | 11/1988 | Schurr | B63B 22/18 242/395 |
| 4,826,099 A | 5/1989 | Johnson | |

(Continued)

*Primary Examiner* — Darren W Ark
(74) *Attorney, Agent, or Firm* — The Dobrusin Law Firm, P.C.; Daniel P. Aleksynas

(57) ABSTRACT

A decoy comprising: (a) an anchor device comprising: (i) a crank; (ii) a spool connected to the crank; and (iii) a locking member located proximate to the spool, wherein a gap separates the spool and the locking member and the gap in a locked position is sufficiently small so that the spool is prevented from rotating and the gap in a deployment position is sufficiently large so that the spool free rotates; (b) an anchor, and (c) an anchor line connecting the anchor to the spool so that the spool in the locked position assists in retracting the anchor and in the deployment position allows the anchor to deploy.

20 Claims, 12 Drawing Sheets

(56) References Cited

U.S. PATENT DOCUMENTS

| | | | |
|---|---|---|---|
| 4,827,653 A * | 5/1989 | Sewell | A01M 31/06 43/2 |
| 5,172,507 A | 12/1992 | Franceschini | |
| 5,279,063 A | 1/1994 | Heiges | |
| 5,367,813 A * | 11/1994 | Cherry | A01M 31/06 43/2 |
| 5,449,308 A | 9/1995 | Thompson | |
| D394,895 S | 6/1998 | Moody | |
| 5,775,022 A * | 7/1998 | Sumrall | A01M 31/06 43/3 |
| 5,865,656 A * | 2/1999 | Sims | B63B 22/04 441/25 |
| 5,893,230 A | 4/1999 | Koltoniak | |
| 5,941,008 A | 8/1999 | Schmidt et al. | |
| 6,412,210 B1 | 7/2002 | Horrell | |
| 6,487,811 B2 * | 12/2002 | Barrett | A01M 31/06 43/3 |
| 6,748,690 B2 | 6/2004 | Igo | |
| 6,760,993 B2 | 7/2004 | Lebens | |
| 7,117,628 B1 * | 10/2006 | Bailey | A01M 31/06 43/3 |
| 8,485,856 B2 | 7/2013 | Paternostro | |
| 8,584,395 B2 * | 11/2013 | Tonkovich | A01M 31/06 43/2 |
| 9,681,657 B2 * | 6/2017 | Kubinec | A01M 31/06 |
| 9,700,037 B1 * | 7/2017 | Chatelain | A01M 31/06 |
| 9,924,710 B1 * | 3/2018 | Wilson | A01M 31/06 |
| 2002/0157299 A1 | 10/2002 | Barrett | |
| 2003/0173445 A1 | 9/2003 | Lebens | |
| 2004/0010957 A1 | 1/2004 | Corbiere, Jr. | |
| 2004/0163300 A1 | 8/2004 | Pinkston | |
| 2006/0283071 A1 * | 12/2006 | Haley | A01M 31/06 43/3 |
| 2013/0014423 A1 | 1/2013 | Tonkovich | |
| 2015/0059229 A1 * | 3/2015 | Miller | A01M 31/06 43/3 |
| 2016/0106090 A1 * | 4/2016 | Young | A01M 31/06 43/2 |

\* cited by examiner

DECOY

FIELD

The present teachings generally relate to a decoy including an improved anchor deployment device and more particularly to a plurality of collapsible features and an anchor deployment devices that are located entirely within the decoy.

BACKGROUND

Generally, decoys are used for hunting and attracting game such as waterfowl. Several decoys are typically deployed so that an appearance of multiple waterfowl in a given area is created. Each waterfowl decoy floats and each decoy is maintained in a position by an anchor that is connected to the decoy so that the decoy may have some movement due to wind and waves, but is generally maintained in a deployed location. However, the depth of the water may vary between each of the decoys or from hunting hip to hunting trip, deployment location to deployment location, or both so that one standard anchor line may be too short for one deployment and too long for another deployment. For example, the water may be two to five feet deep when ground hunting from a ground blind and ten to twenty feet deep when hunting from a layout boat, thus, the length of the anchor lines may have to be changed and/or varied from use to use.

Further, after use a plurality of decoys are typically placed into one carrying device. When in a carrying device, each of the anchor lines may become intertwined with other anchor lines, other decoys, or both so that during a subsequent use, time and effort are spent separating each decoy. Moreover, each decoy may include a head and a keel that project from a body of the decoy and the head and keel may project in such a manner that it is difficult to arrange the decoys in the carrying device so that multiple carrying devices are needed to carry the decoys from a vehicle to a hunting location and back to the vehicle.

Examples of decoys are disclosed in U.S. Pat. Nos. D394895; 1,789,649; 1,951,429; 1, 967, 902; 2,917,857; 3,079,719; 3,704,538; 4,340,192; 4,674,219; 4,757,630; 4,826,099; 4,827,653; 5,279,063; 5,367,813; 5,449,308; 5,893,230; 5,941,008; 6,412,210; 6,487,811; 6,760,993; 7,117,628; 8,485,856 and U.S. Patent Application Publication Nos. 2002/0157299; 2003/0162200; 20040163300; and 2013/0014423 all of which are expressly incorporated herein by reference for all purposes. What is needed is a decoy that includes an anchor system that rapidly deploys an anchor to a variety of depths. What is needed is a decoy with a plurality of parts that are movable from a deployed state to a stored state when the decoy is not in use so that the decoys can be efficiently stored. What is needed is an anchor device that is substantially located within an open space within the decoy so that the anchor device is maintained out of water. It would be attractive to have an anchor line guide that prevents water from entering an open space in a decoy, the anchor device, or both. It would be attractive to have a head that is movable and lockable in virtually any position. It would be attractive to have a vibrator that vibrates the decoy when in a deployed state. It would be attractive to have one or more movable keels that movable between a stored state and a deployed state.

SUMMARY

One possible embodiment of the present teachings include: a decoy comprising: (a) an anchor device comprising: (i) a crank; (ii) a spool connected to the crank; and (iii) a locking member located proximate to the spool, wherein a gap separates the spool and the locking member and the gap in a locked position is sufficiently small so that the spool is prevented from rotating and the gap in a deployment position is sufficiently large so that the spool free rotates; (b) an anchor; and (c) an anchor line connecting the anchor to the spool so that the spool in the locked position assists in retracting the anchor and in the deployment position allows the anchor to deploy.

One possible embodiment of the present teachings include: a decoy comprising: (a) an anchor device comprising: (i) a crank; (ii) a spool connected to the crank; and (iii) a locking member located proximate to the spool, (iv) a lock device at least partially located within the locking member, wherein a gap separates the spool and the locking member and the gap in a locked position is sufficiently small so that the spool is prevented from rotating by the lock device extending between the spool and the locking member and the gap in a deployment position is sufficiently large so that the spool is disposed over the lock device and the spool is free to rotate; (b) an anchor; (c) an anchor line connecting the anchor to the spool so that the spool in the locked position assists in retracting the anchor and in the deployment position allows the anchor to deploy; and (d) one or more collapsible keels located on a bottom of the decoy so that during use the one or more collapsible keels during use are extended below the decoy and during storage the collapsible keels are collapsed into a keel recess so that the one or more collapsible keels are substantially planar with the bottom of the decoy.

Another possible embodiment of the present teachings include: a decoy comprising: (a) a body having a recess; (b) a cover covering the recess in the body so that the decoy is substantially fluid resistant, wherein the cover includes a cover locking member, (c) an anchor device located in the recess, the anchor device comprising: (i) a crank; (ii) a spool connected to the crank; and (iii) a locking member located proximate to the spool, (iv) a lock device at least partially located within the locking member, (v) a bias member in communication with the lock device so that the bias member biases the lock device towards the spool; (vi) a fastener that is connected to and extends from the crank to the lock device through the spool; (vii) a locking member fastener connecting the locking member to the decoy, wherein a gap separates the spool and the locking member and the gap in a locked position is sufficiently small so that the spool is prevented from rotating by the lock device extending between the spool and the locking member and the gap in a deployment position is sufficiently large so that the spool is disposed over the lock device and the spool is free to rotate; (d) an anchor; (e) an anchor line connecting the anchor to the spool so that the spool in the locked position assists in retracting the anchor and in the deployment position allows the anchor to deploy; (f) one or more collapsible keels located on a bottom of the decoy so that during use the one or more collapsible keels during use are extended below the decoy and during storage the collapsible keels are collapsed into a keel recess so that the one or more collapsible keels are substantially planar with the bottom of the decoy; and (g) a head having a head locking member that is complementary to the cover locking member so that the head is movable to a plurality of positions and the head is lockable in any of the plurality of positions.

The present teachings provide a decoy that includes an anchor system that rapidly deploys an anchor to a variety of depths. The present teachings provide a decoy with a plurality of parts that are movable from a deployed state to a stored state when the decoy is not in use so that the decoys can be efficiently stored. The teachings herein provide an anchor device that is substantially located within an open space within the decoy so that the anchor device is maintained out of water. The teachings provide an anchor line guide that prevents water from entering an open space in a decoy, the anchor device, or both. The present teachings provide a head that is movable and lockable in virtually any position. The teachings herein provide a vibrator that vibrates the decoy when in a deployed state. The teachings herein provide one or more movable keels that are movable between a stored state and a deployed state.

DETAILED DESCRIPTION

Figure 1:
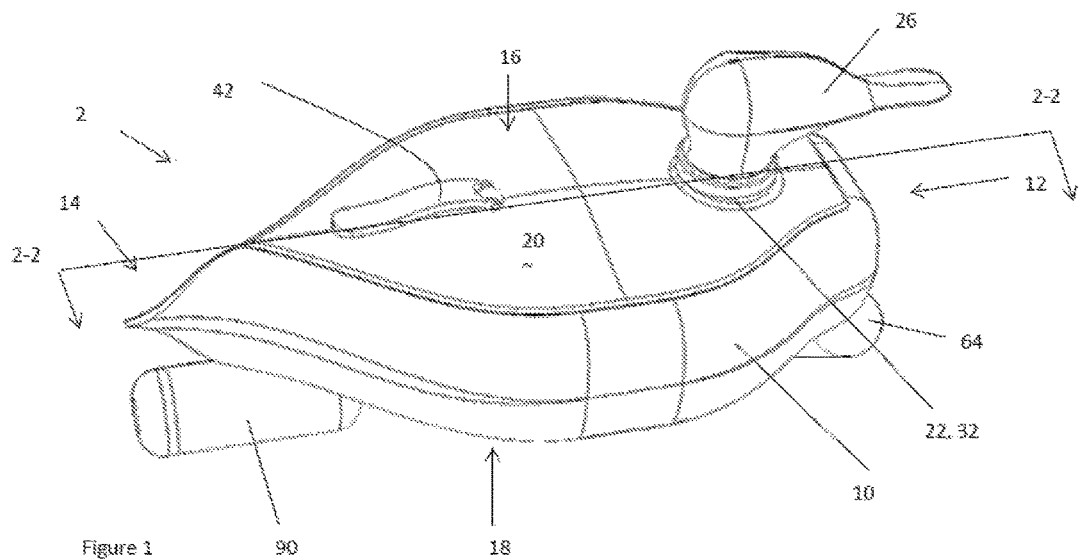
FIG. 1 illustrates a perspective view a decoy.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings claim priority to U.S. Provisional Patent Application Ser. No. 61/873,896, filed on Sep. 5, 2013 the contents of which are incorporated by reference herein in their entirety for all purposes. The decoy may be any decoy that may be used to attract game. Preferably, the decoy may be any decoy that floats. More preferably, the decoy may be a waterfowl decoy. Even more preferably, the decoy is a duck or goose decoy. However, the decoy may be a decoy for swans, cranes, herons, egrets, cormorants, shore birds, seagulls, teals, wigeons, mergansers, scoters, the like, or a combination thereof. The decoy may be one piece. Preferably, the decoy is made of a plurality of pieces, some of which are movable pieces. The decoy may include a substantially solid interior. Preferably, the decoy includes a hollow interior. The decoy may be made of any material that floats, any material that is resistant to shot from a gun, can withstand shot from a gun and continue to float, or a combination thereof. The decoy may be made of a natural material, a synthetic material, include plastic, include a polymer, include an elastomer, or a combination thereof. The decoy may be molded, blow molded, pultruded, injection molded, plastic molded, the like, or a combination thereof. The decoy may be made of plastic, delrin, a thermoplastic, a fiber reinforced material, an elastomer, a thermoset, or a combination thereof. The decoy has a front, back, right side, left side, top, and bottom.

The front of the decoy may be the side of the decoy that includes a head, where the anchor is deployed, that includes a vibrator, a propulsion system, that has the largest width, an anchor port, or a combination thereof. The back of the decoy is opposite the front of the decoy. The back of the decoy may be: where the anchor is deployed, tapered to a point, include a vibrator, include a keel, an anchor port, or a combination thereof. The right side and the left side of the decoy may be a mirror image of each other. The right side and left side may be: solid, substantially free of holes so that water cannot enter the decoy, or both. The bottom may be: substantially covered and/or entirely covered with water when the decoy is deployed; include one or more fasteners for connecting one or more components; include one or more fastener recesses so that the fasteners are flush with the bottom, are countersunk, are hidden from view, or a combination thereof; include one or more keel recesses so that the keels in a storage position are flush, countersunk, hidden from view, or a combination thereof; an anchor port; a vibrator attachment; a hinge; a pivot point for the keels; one or more through holes for connecting a crank, an anchor device, the head, or a combination thereof; one or more keels; one or more vibrators; a propulsion system, or a combination thereof. The bottom side may be directly opposite a top side. The top side may be any side that is located substantially out of the water when the decoy is deployed in water. The top side may include: a crank, a head, a cover, an crank recess, or a combination thereof.

The cover may function to prevent fluid from entering the decoy from the top. The cover may include one or more holes so that one or more features may extend through the cover. The cover may include one or more recesses (e.g., crank recess) so that one or more decoy features may be countersunk, extend into the cover, be flush with the cover, be fit within the cover and hidden from view under a movable member, or a combination thereof. The one or more recesses may function to receive a feature of the decoy so that the feature is concealed from view. The one or more recesses may receive a movable feature so that the movable feature is prevented from moving when the one or more movable features is located in the recess. For example, a crank connected to an anchor device may be folded into a recess and the recess may prevent movement of the crank so that the crank is prevented from rotating and deploying and/or further deploying an anchor. In another example, a fastener may be placed into a recess and the recess may prevent movement of the fastener so that the fastener may maintain the cover locked on the body.

The cover may include one or more connecting features, one or more alternating teeth, or both for connecting the cover to the body. The cover may include one or more or more through holes, one or more recesses, one or more locking members, or a combination thereof. The cover may be integrally connected to the body of the decoy, may be a separate piece, or a combination of both. The cover may be complementary to the body so that the body and cover form a sealed connection. The cover may be locked on the body by the head, the crank, or both; hingedly connected to the body; snap fit on the body; form an interference fit with the body; or a combination thereof. The cover may be connected to the body by any device so that a seal may extend between the cover and the body.

The seal may function to prevent water from entering the decoy through the cover. The seal may be any device that assists in connecting the cover to the body of the decoy. The seal may be any device that assists in maintaining a connection between the cover and the body. The seal may be any device that extends around a periphery of the cover, a periphery of a recess in the body, or both. The seal may be made of any material that assists in preventing water from penetrating the decoy through the cover, an opening in the body, or both. The seal may create pressure between the cover and the body so that the cover and body are fixedly connected. The seal may be any device that assists one or more locking features in locking one or more components of the decoy together, retaining the head within the decoy, or both The one or more locking members (i.e., cover locking members) may be any feature located in the cover that assists in locking the cover to the body, assists in locking a head to the cover, locking the head in a position, or a combination thereof. The one or more locking members may function to lock the cover to the body. The one or more locking members may be the crank, the head, or both. The one or more locking members may be a series of ribs, raised features, detents, or a combination thereof that assist in locking the head in a specific position. The one or more locking members may be any member that is complementary to one or more locking members of the head so that the cover assists on preventing movement of the head when the head is moved to a desired location. The locking members may be in a donut configuration, a toroid configuration, a straight configuration, located intermittently around a circle, or a combination thereof. The one or more locking members may be used in conjunction with the head and a fastener so that as the fastener is tightened to connect the head on the decoy, the cover is moved into and connected to the body of the decoy.

The head may be any part of the decoy that provides the decoy with an appearance of a desired species of game, of waterfowl, or preferably a duck. The head may be any removable part of the decoy. The head may be any part of the decoy that extends through the cover, the body, or both. The head may be any part of the decoy that assists in locking a cover unto the body. The head may be fixedly connected to a cover, a body, or both and is rotationally movable. The head may be permanently mounted to the cover and the cover may be rotationally movable around the head so that a recess, an internal chamber, or both in the body is accessible. The head may be permanently located in the decoy and movable, extendable, releasable, or a combination thereof so that head may release a seal between the cover and the body such that the cover is movable about the head so that a recess, an internal chamber, or both in the decoy are accessible. The head may be removable from the decoy so that once removed the cover may be removed from the body so that the recess, an internal chamber, or both are exposed. The head may be connected to the cover by one or more locking devices (i.e., head locking device).

The head locking device may be any device that connects the head to the decoy. The head locking device may be any device that allows the head to rotationally move, laterally move, longitudinally move, or a combination thereof without the head being removed. The head locking device may removably connect the head to the body, permanently connect the head to the body, or a combination of both. Preferably, the head locking device assists in connecting the head and the cover to the body. The head locking device may extend all of the way through the cover, the body, or both. The head locking device may be any fastener that assists in connecting the head to the body, the cover, or both. The head locking device may be a bolt, a screw, a nail, a threaded member, a christmas tree, rivet, pin, pinned member, push pin, a dip, or a combination thereof. The head locking device may be a ribbed portion of the head that may be gripped by a head fastening device. The head locking device may connect the head within the body, to the body, or both. The head locking device may include one or more ribs, one or more recesses, or both that may be used to form a connection. The head locking device may form a snap fit, a friction fit, a locked connection, may extend into a portion of the decoy, or a combination thereof. The one or more locking device may have a positive connection feature that may be contacted by a head fastening device. The head and head locking device may be removable from the decoy so that different heads may be interchanged into the decoy. The head may be removable from the head locking device. Preferably, the head is integrally part of the head locking device. The head may be changed so that the decoy has a resting configuration, the head is up, the head is down, the mouth is open, the mouth is closed, the head is extended, or a combination thereof. A plurality of different head configurations may be used with each decoy. The head locking device may be any fastener where the tightness of the fastening may be varied, adjusted, or both. Preferably, the head locking device is a threaded bolt. The head locking device may be any device that may be connected to the decoy by one or more head fastening devices.

The head fastening device may be any device that assists in connecting the head locking device to a decoy. The head fastening device may be a complementary feature that assists in maintaining the head locking device within the decoy, in the decoy, or both. The heads fastening device may function to allow rotation of the head without the head being removed. The head fastening device may be located within the decoy, located outside of the decoy, fixed in a wall of the decoy, located on a bottom of the decoy, located in a recess, or a combination thereof. The head fastening device may grip a portion of the head, the head locking device, or both. The head fastening device be movable so that the head, the head locking device, or both may extend into the head fastening device. The head fastening device may receive one or more ribs, positive features, or both to lock the head in the decoy. The head fastening device may be opposing gripping portions that grip the head locking device. The head fastening device may extend into the head locking device so that a fixed connection is formed. The head fastening device may longitudinally move, radially move, laterally move, or a combination thereof so that the head locking device is released, gripped, or both. The head fastening device may be moved by one or more actuators, return devices, or both. Preferably, the head fastening device is a wing nut. The head fastening device may be a nut, a bolt, a wing nut, a locking member, a threaded member, a clamp, or a combination thereof. The head fastening device may be used to pull the head towards the bottom so that a head locking member is pulled into communication with the cover, a cover locking member, or both and the cover locked to the body.

One or more actuators may function to move the head fastening device to lock the head to the decoy, release the head from the decoy, or both. The head fastening device may actuate to move a portion of the head fastening device from the head locking device. The actuators may move one or more portions of the head fastening device. The one or more actuators may be a push bottom to move the head fastening device. The one or more actuators may be a portion that is gripped, twisted, laterally moved, longitudinally moved, or a combination hereof to release and/or add a head to a decoy. One or more return devices, bias devices, or both may be located within the actuator to move the actuator, return the actuator to a locked position, move the actuator to a home position, or a combination thereof. The one or more return devices may be a spring, an elastic piece, or both. The one or more return devices may resist releasing of the head. The one or more return devices may be located within the one or more actuators and proximate to one or more head locking members.

The head locking member may be any member that assists in retaining a movable head on the decoy, locking a head in a position, or both. The head locking member may be any member that is complementary to the cover locking member. The features of the cover locking member are incorporated herein and may be used as the head locking member. The head locking member may be any part of the decoy that extends around a head locking device so that the head locking member prevents movement of the head about the head locking device. The head locking member may be located proximate to an anchor device, assist in holding the cover over the anchor device, or both.

The anchor device may be any device that assists in deploying and retracting one or more anchors. The anchor device may be any device that rapidly deploys one or more anchors. The anchor device may free spool during deployment so that the anchor deploys without interaction from a user. The anchor device may fit entirely within a decoy, have a portion that extends out of the decoy, or both. The anchor device may include a plurality of parts that work in combination to deploy and retract one or more anchors so that the anchors retain the decoy in place. The anchor device may include one or more cranks.

The one or more cranks may be any device that assists in deploying and/or retracing one or more anchors. The one or more cranks may be a feature that a user grips to move one or more parts of the anchor device so that an anchor is retracted, deployed, or both. The one or more cranks may be a part of the anchor device that is external the decoy and is in communication with an anchor device located in an internal cavity of the decoy. The one or more cranks may fit within a portion of the cover so that the crank is prevented from moving, is concealed from view, is planar with the cover, or a combination thereof. The crank may drive one or more cogs, gears, or both that drive one or more spools located within the decoy. The crank may be a direct drive with a spool located within the decoy. The crank may be connected to one or more fasteners by one or more crank caps.

The one or more crank caps may be any device that connects the crank to one or more pieces of the anchor device. The one or more crank caps may function to release or retract an anchor. The one or more crank caps may function to connect to a crank so that an anchor can be released and/or retracted. The crank caps may function to extend into the body when in a storage position and extend out of a body into a rotation position. The one or more crank caps may have a portion that axially moves along a fastener. The entire crank cap may be axially extendable along a fastener. A portion of a crank cap may be axially extendable along a fastener. The crank cap may function as a release button (e.g., a button to free spool the spool and weight during deployment). For example, pressing on the crank cap may allow the spool to freely rotate so that the anchor is deployed. The crank cap may include a connection portion and a siding portion.

The connection portion may form a connection with the fastener. The connection portion may form a connection with the fastener so that as the crank cap is rotated the spool is freed to move or is locked (e.g., moved from a deployment state to a locked state or vice versa). The connection portion may rotationally move about the fastener and as the connection portion rotates the connection portion may axially move. The connection portion may have a rotatable connection with a fastener. The connection portion when axially moved may form a gap between the locking member so that the spool is free to move, is locked, or both. The one or more connection portions may be substantially axially static relative to the sliding portion when the sliding portion is moved into a storage position, a retraction position, and a deployment position.

The one or more sliding portions may be axially movable along a fastener, the connection portion, or both. The one or more sliding portions may extend around the connection portion. The one more sliding portions may axially move about the connection portion. The one or more sliding portions may move entirely into the decoy, extend partially and/or entirely out of the decoy, or both. The one or more sliding portions may be connected to the connection portion by one or more pins. The sliding portion may move axially along the connection portion and be retained on the connection portion by one or more pins. The sliding portion may include one or more slots that allow the sliding portion to axially move about the connection portion.

The one or more crank caps may include a slot so that the crank cap and the crank are axially movable along the axis of the fastener. The one or more crank caps may be partially and/or fully extendable into the body, the cap, or both of the decoy. The crank caps may include one or more through holes that receive a pin, a movable member, or both that prevent the crank cap from axially moving when the crank is in a stored position and allow the crank cap to axially move when the crank is in a rotation position. The crank caps may include one or more positioning features such as recesses, detents, or both.

The one or more positioning features may function to freeze the crank cap in an up position, a down position, or a position therebetween. The one or more positioning features may function to freeze the crank cap in an extended position, a retracted position, or a position therebetween. The one or more positioning features may prevent the crank cap from retracting back into the decoy when moved to an extended position. The one or more positioning features may snap into place, lock into place, be tightened, pressed into place, form a friction fit, form an interference fit, or a combination thereof. The one or more positioning features may be a static feature located within the crank cap that minimizes movement of the crank cap. The one or more positioning features may include one or more static members, one or more movable members, or both.

The one or more positioning features may include one or more static features such as a detent, a recess, a cavity, an inset, or a combination thereof that receives one or more movable members that assist in suspending the crank cap, freeze the crank cap, or both in a predetermined position. The one or more static members may be part of the crank cap, the connection portion, the sliding portion, or a combination thereof. The one or more static members may not move relative to the connection portion, the sliding portion, or both. The one or more static members may move relative to the one or more fasteners. The one or more positioning members may include one or more static members and one or more movable members.

The one or more movable members may function to move between two or more static features. The one or more movable members may function to move with a fastener, relative to a fastener, moved by a fastener, or a combination thereof. The one or more movable members may be part of a fastener that moves when the sliding member moves. The one or more movable members may move relative to both the fastener and the connection portion. The one or more movable members may move between the fastener and the connection portion; the connection portion and the sliding portion; or a combination of both. The one or more movable members may roll, spin, rotate, slide, or a combination thereof relative to the connection portion, the sliding portion, the faster, or a combination thereof. The one or more movable members may move and fall into the static features so that movement of the crank cap is inhibited. The one or more movable members may be a ball bearing, a bb, a sphere, a marble, cylinder, or a combination thereof. The one or more movable members may be a pin, a feature that connects the crank cap to a fastener, or both.

The pins, the movable member, or both may extend through the one or more through holes when the crank is in a fully stored position, a full rotation position, or both. The pins, the movable member, or both may fully and/or partially retract when the crank is partially in the stored position, partially in the rotation position, or both. For example, the crank may be moved so that the pins, the movable member, or both move out of the through holes in the crank cap so that the crank cap is axially movable and then the crank is fully moved into the rotation position so that the crank cap is locked in an extended position. The one or more crank caps may be a pivot point for the crank. The one or more crank caps may be a hinge that the crank rotates about so that the crank is foldable from a deployed position to a storage position. The one or more crank caps may be an integral part of the crank that assists the crank in deploying and/or retracing an anchor. The one or more crank caps may be a removable device that assists the crank in deploying and/or retracing an anchor. Preferably, the one or more crank caps include a connection feature so that the crank cap connects the crank to a fastener. The crank cap may include one or more fastening features so that the crank cap cannot be removed from the anchor device without unlocking, removing, or both the fastening features. More preferably, the crank cap includes threads for connecting to a fastener.

The fastener may function to connect the crank to the anchor device. The fastener may be any device that assists the crank in retracting and/or deploying an anchor. The fastener may extend substantially the height of the anchor device. The fastener may connect the crank to a spool so that the spool may be used to deploy and/or retract an anchor. The fastener may be directly connected to the spool, indirectly connected to the spool, or a combination thereof. For example, the fastener may be connected to one or more gears and the one or more gears may be in contact with the spool so that the spool is moved. The fastener may include one or more shoulders so that the fastener cannot be removed from the anchor device, so that the fastener can only be removed in one direction, or both. The faster may include one or more connection features that connect the anchor device to an anchor cap, the fastener, or both. The fastener and one or more adjacent components may be form compression forces on one or both sides of the spool. For example, a fastener, the crank cap, a bias member, or a combination thereof may be moved into contact with the spool so that as fastener is moved the spool is moved. The fastener may be a cylindrical feature that may be rotated during use so that an anchor may be deployed and/or retracted. The fastener may be a bolt, a threaded member, an integral part of a spool that extends from the spool, or a combination thereof. Preferably, the fastener is a bolt that extends through the anchor device and is connected to the crank, the crank cap, or both. The fastener may be part of the spool, extend through the spool, extend partially through the spool, or a combination thereof.

The spool may be connected to the fastener so that as the fastener moves the spool is moved with the fastener. The spool may function to assist in retracting and/or deploying an anchor. The spool may be any device that anchor line is stored on, wrapped around, or both. The spool may be any device that may be moved in a first direction during deployment and moved in a second direction during retraction. The spool may be any spool that is sufficiently small so that the spool may fit within a decoy. The spool may be sufficiently large so that the spool may retract an anchor during movement with minimal movement of the spool. The spool may be of sufficient size so that upon one rotation of the spool 5 cm or more, 10 cm or more, 15 cm or more, or even 20 cm or more of line is wound around the spool. The spool may be sized so that upon one rotation of the spool 1 m or less, 75 cm or less, or about 50 cm or less is wrapped around the spool. The spool may have sufficient strength to lift an anchor, withstand impacts caused by waves and/or wind pushing the decoy and an anchor line tugging on the spool, force caused by a lock device, or a combination thereof. The spool may have sufficient strength to lift a 1 Kg weight or more, a 3 Kg weight or more, or even a 5 Kg weight or more. The spool may be round, oval, square, rectangular, or a combination thereof. The spool may rotate around an axis. The spool may have an eccentric rotation. Preferably, the spool is substantially round and rotates around the fastener. The spool may have one or more upper edges that retain the anchor line within the spool, so that the anchor line is directed onto the spool, or both. The spool may have one or more recesses on a top side or a bottom side that include one or more recesses and preferably a plurality of recesses.

The one or more spool recesses may be any part of the spool that is a depression that extends into the spool, through the spool, or both. The one or more spool recesses may be any part of the spool that acts as a brake, prevents movement of the spool, or both. Preferably, each spool includes a plurality of spool recesses and the spool recesses are evenly distributed around the spool so that a lock device may extend into a spool recess at virtually any point. The spool may have 3 or more, 4 or more, 5 or more, 6 or more, 7 or more, 8 or more, 9 or more, 10 or more, 12 or more, 15 or more, or even 20 or more spool recesses. The one or more spool recesses may be of sufficient size so that the spool recesses receive another part of the anchor device. Preferably, the one or more spool recesses receive a lock device that contacts a portion of the spool recess and prevents movement of the spool. More preferably, the lock device fits within the one or more spool recesses so that the spool is prevents from rotating in a deployment direction and a retraction direction simultaneously.

The lock device may function to prevent movement of the spool. The lock device may be any part of the anchor device that prevents movement of the spool, locks the spool, slows movement of the spool, or both. Preferably, the lock device prevents the spool from rotating. The lock device may be static. The lock device may be movable along the axis of the spool. The lock device when moved along its axis away from the spool may allow the spool to rotate. The lock device may be moved away from the spool so that a gap is created. The gap may be sufficiently large so that the spool freely rotates without interference from the lock device. The lock device may contact the spool and the spool may rotate and deploy an anchor. The force, pressure, or both created by the lock device on the spool may be sufficiently small when the crank is rotated so that the anchor device releases the anchor. For example, the lock device may intermittently contact the spool but the spool may rotate and deploy the anchor. The lock device may be jointed any may bend, fold, be angled, extended along the axis of the spool, retracted along the axis of the spool, or a combination thereof. The lock device may be planar, include one angled edge, two angled edges, or a combination thereof. One edge may be angled so that during rotation of the crank the edge may move the lock device down so that the anchor line may be retracted. The lock device may be rigid. The lock device may be any device that is sufficiently rigid to prevent movement of a spool caused by an anchor being pulled down, by waves jarring the decoy, or both. The lock device may withstand the weight of the anchor or more, a weight of about 1 Kg or more, about 3 Kg or more, or about 5 Kg or more. Preferably, the lock device is static and the spool moves along its axis towards the lock device in a locked position, and away from the lock device in a deployment position (e.g., a free spool position). The lock device may prevent movement in the deployment direction, the retraction direction, or both. The lock device may prevent movement in the deployment direction and may be moved out of the way when the spool is moved in the retraction direction so that during retraction if the crank is released the spool may be prevented from re-deploying the anchor. The spool, the lock device, or both may be moved away from and/or towards one another by one or more bias members.

The one or more bias members may be any device that assists in moving the spool axially along its axis, moving the lock device axially relative to the spool axis, or both. The one or more bias members may be any device that moves the spool off of the lock device so that the spool may be moved, moves the lock device into a spool recesses when the spool has not moved into a free spool position, or both. The one or more bias members may be any device that moves the spool away from the lock device so that the spool may move. The one or more bias members may be located above the locking member, below the locking member, in the locking member, or a combination thereof. The one or more bias members may be a spring, an elastomeric material (e.g., a rubber ring that extends over and/or under the lock device), a bent material, a spring steel, a compressible member, or a combination thereof. The one or more bias members may be made of metal, an elastomer, rubber, an elastically deformable polymer and/or plastic, or a combination thereof. The one or more bias members may create a bias force between the spool and a locking member so that the bias member axially moves the spool away from the locking member. The one or more bias members may create a bias force between the lock device and the spool so that the spool is prevented from moving by an interlock being formed between the spool and the locking member by the lock device, so that the lock device is moved out of the recess during retraction and reinserted into a subsequent spool recess by the bias member, or both.

The locking member may be any device that locks the anchor device to the decoy, a bottom of the decoy, or both. The locking member may be static and/or movable. The locking member may house one or more, two or more, or three or more components of the anchor device. The locking member may lock one or more anchor device components so that the components are maintained static relative to the locking member, relative to the spool, relative to the decoy, or a combination thereof. The locking member may be any device that includes one or more through holes, one or more connection ports, one or more partial holes, one or more recesses, or a combination thereof for connecting together two or more adjacent pieces directly and/or indirectly. The locking member may act as a vessel for indirectly connecting the spool to the decoy. The locking member may act as a pivot point for the faster, as an axis for the spool to rotate about, as a stabilizer to stabilize the fastener as the fastener is rotated, or a combination thereof. The locking member may be any shape so that one or more components of the anchor device is connectable to the locking member. The locking member may be any size so that the locking member fits within an internal cavity of the decoy. The locking member may be round, oval, square, rectangular, a polygon, or a combination thereof. The locking member may include one or more pegs that form a complementary fit with the decoy so that the locking member is prevented from moving. The one or more pegs may be a projection and/or recess in the locking member that extends into and/or receives a portion of the decoy so that the locking member is retained is a position. The locking member may include at least one port, through hole, partial recess, or a combination thereof of receiving at least a portion of the fastener, the lock device, a bias member, or a combination thereof. Preferably, the lock device extends at least partially of the way through the locking member and the bias member prevents the lock device from extending all of the way through the locking member. Preferably, the fastener passes substantially all of the way through the locking member. More preferably, the fastener extends into the locking member until the fastener contacts an anti-rotation device.

The anti-rotation device may function to substantially prevent rotation of the fastener when the crank is rotated. The anti-rotation device may increase friction to the fastener so that the fastener is prevented from rotating when the connection between the crank and the fastener is not tight, but allows for some slip when the connection between the fastener and crank is tight so that components therebetween are not compressed, damaged, or both. The anti-rotation device may be made of any material that prevents the fastener from rotating during movement of the crank in the deployment direction (e.g., unloosening the connection between the crank and the fastener) so that the spool may spin freely. The anti-rotation device may be made of any material that provides some slip during movement of the crank in the retraction direction (e.g., rotating the spool so that line is wound around the spool). The anti-rotation device may be a bias member as is discussed herein, may be made of the same materials as the bias member, or both. The anti-rotation device may axially bias the fastener when the anchor device is in the deployment position so that the gap between the spool and the locking member is increased. For example, as the crank is moved in the deployment direction the anti-rotation device moves the fastener axially so that the gap between the spool and the locking member increases in size so that the gap is sufficiently large that the lock device cannot prevent rotation of the spool. The gap may be about 1 mm or more, 2 mm or more, 3 mm or more, or even about 4 mm or more. The gap may be any distance so that the spool may rotate relative to the anchor device, the locking member, the anti-rotation device, or a combination thereof. The gap may be any distance so that the spool may freely rotate. The anti-rotation device may be made of a compressible material so that when the crank is loosened from the deployment position the fastener is axially moved. The anti-rotation device may be connected to a locking member fastener, a fastener, or both. The anti-rotation device may include a threaded portion. The anti-rotation device may indirectly move one or more spacers located along the fastener.

The one or more spacers may be any device that creates a space between two or more adjacent components of the anchor device. The one or more spacers may assist in preventing rotation of the spool. The one or more spacers may create compression forces on the spool so that the spool is prevented from rotating. The compression forces of the spacers on the spool may assist in preventing rotation of the spool, may be the only device that prevents rotation of the spool, or both. For example, when the crank is moved in the retraction direction the crank may compress the one or more spacers on one or more sides of the spool so that a the compression forces of the spacers on the spool move the spool directly with the crank. The one or more spacers may set the minimum gap between the spool and the locking member. The one or more spacers may have a height of 1 mm or more, 2 mm or more, 3 mm or more. The one or more spacers may have a height of 1 cm or less, 8 mm or less, or about 6 mm or less. The one or more spacers may move the spool when a shoulder of the fastener pushes on the spool. The one or more spacers may extend through the cover of the decoy. The anchor device may be free of spacers. The one or more spacers may contact one side of the cover and the crank cap may contact an opposing side of the cover so that a seal is formed around a through hole in the cover. The one or more spacers may extend along the fastener that is substantially parallel to the locking member fastener.

The one or more locking member fasteners may be any device that connects the locking member to the decoy so that the locking member is prevented from moving. The one or more locking members may be used in conjunction with one or more pegs so that the one or more locking member fasteners and one or more pegs prevent movement of the locking member fastener. The locking member fastener may extend through a through hole in the locking member so that locking member and the locking member fastener are fixedly connected. The locking member fastener may extend through a bottom of the decoy and partially into the locking member. The locking member fastener may be any fastener discussed herein. Preferably, the locking member fastener is a threaded member such as a bolt. The locking member fastener may extend away from the spool, the spool cover, or both.

The spool cover may be any device that covers all or a portion of the spool and assists in placing anchor line on the spool, maintaining anchor line on the spool, or both. The spool cover may surround the spool so that the anchor line is guided onto the spool through the spool cover. The spool cover may be located between an upper edge and a lower edge of the spool so that the spool cover retains the anchor line on the spool. The spool cover may be substantially circular, donut shaped, toroid shaped, complementary to the spool, or a combination thereof. The spool cover may be made of any material that is resistant to damage from water, is sufficiently rigid to withstand weight on the anchor line, or both. The spool cover may be made of metal, steel, stainless steel, plastic, a polymer, rubber, or a combination thereof. The spool cover may include an exit port that may assist connect to an anchor line guide and assist in guiding anchor line onto the spool.

The exit port may be located at any location on the spool cover so that line is guided onto and off of the spool. The exit port may be angled so that the anchor line is guided tangential to the spool and helically wrapped around the spool. The exit port may be any hole through the spool cover so that anchor line may be added and subtracted from the spool. The exit port may be connected to an anchor line guide.

The anchor line guide may be any device that extends between the exit port of the spool cover and the anchor port in the decoy. The anchor line guide may be a tubular structure that surrounds all or a portion of the anchor line. The anchor line guide may be substantially straight. The anchor line guide may include one or more dips, bows, arcuate portions, bends, concave bends, or a combination thereof. The anchor line guide may enter the decoy and curve upwards toward the cover the decoy. The anchor line guide may prevent water from entering the decoy, from entering the decoy and remaining within the decoy, from entering the anchor device, or a combination thereof. Water may enter the anchor line guide and an arcuate portion of the anchor line guide may prevent water from entering an internal space in the decoy. The anchor line guide may be made of any material so that the anchor line is guided through the anchor port of the decoy and unto the spool. The anchor line guide may be made of any material so that the anchor line guide is resistant damage from water, is sufficiently rigid to maintain a shape, is sufficiently rigid to assist in supporting a weight, is sufficiently strong to resist damage from movement of the anchor line through the anchor line guide. The anchor line guide may be made of metal, plastic, a polymer, rubber, steel, delrin, styrene butadiene, or a combination thereof. The anchor line guide may be sufficiently large so that one or more anchor lines may extend through the anchor line guide.

The anchor line may be any line so that an anchor may be deployed and retracted by the anchor line. The anchor line may be a single piece of rope, a braded rope, a intertwined rope, a nautical rope, a nylon rope, or a combination thereof. The anchor line may be made of synthetic material, natural material, nylon, hemp, metal, or a combination thereof. The anchor line may be made of any material with sufficient strength so that the anchor line may be used to deploy and retract and anchor.

The anchor may be any device that prevents the decoy from moving when deployed. The anchor may extend from any position of the decoy. The anchor may extend from and/or be connected the front, back, bottom, a keel, or a combination thereof. The anchor may be made of lead, steel, iron, or a combination thereof. The anchor may be made of any material that is resistant to damage from water and/or substantially prevents movement of the decoy. The anchor may be coated. The anchor may be round, oval, include one or more prongs, include one or more hinges, one or more projections, or a combination thereof. The anchor may maintain the decoy in a direction, assist in maintaining the decoy pointed in a specific direction, work in conjunction with one or more keels on the decoy, or a combination thereof.

The decoy may include one or more keels. The one or more keels may be any device that assists in maintaining a decoy pointed in a specific direction. The one or more keels may include one or more holes, caps, or both. The one or more holes, caps, or both may allow for ingress or egress of weight for assisting in maintaining the decoy in an upright position. The one or more holes, caps, or both may allow for entry of sand, water, a weight, or a combination thereof. The one or more keels may be any device that extends from the decoy into the water so that as water flows past the keel the decoy is maintained in a direction. The one or more keels may be a port keel and a starboard keel (e.g., one keel is movable towards a starboard side for storage and one keel is movable towards the port side for storage). The port keel and the starboard keel may be substantially the same size, deployed to substantially the same angle, or both. The port keel and the starboard keel may be deployed to different directions (e.g., the port keel may extend to about a 75 degree angle from the bottom on the port side and the starboard keel may extend to about a 75 degree angle from the bottom at the starboard side). The port keel and starboard keel may be aligned along a plane, form a "V" shape, be staggered, or a combination thereof. The one or more keels may be an integral part of the decoy. Preferably, the one or more keels are movable, are foldable, are collapsible, rotatable around an axis, or a combination thereof. The one or more keels may include a hinge along an upper portion of the keel and the keel may rotate around the hinge. The keel may be connected to the decoy via one or more pins and the one or more pins may extend into the decoy. The one or more pins and/or one or more integral projections may extend into a recess in the bottom of the decoy so that the one or more keels may extend around the pins and retract into the keel recess.

The one or more keel recesses may be any part of the decoy that receives the one or more keels in a retracted state. The one or more keel recesses may be any part of the decoy that stores the one or more keels so that the keels are substantially flush with the bottom of the decoy, are counter sunk so that the keels are entirely located within the recesses, the keels are protected from damage during storage, or a combination thereof. The one or more keel recesses may be large enough to receive one or more keels. Preferably, each of the one or more keel recesses is substantially the same size and shape as each of the one or more keels so that the keels fit within and are locked within the keel recesses when the one or more keels are moved into the stored state. The one or more keel recesses may include one or more detents, locks, projections, locking features, or a combination thereof to retain the one or more keels within the one or more keel recesses. The one or more keel recesses may be located proximate to one or more vibrator fasteners.

The one or more vibrator fasteners may be any device that assists in connecting one or more vibrators to the decoy. The one or more vibrator fasteners may be any device that extends from and/or is located within the decoy so that a vibrator may be connectedly secured to the decoy. The one or more vibrator fasteners may be threaded, a snap fit, a sliding lock, a through hole, a projection that extends into the vibrator, a clip, a detent, or a combination thereof. The vibrator fasteners may extend from the decoy, receive a part that extends from the vibrator, or both.

The vibrator may be any device that shakes, moves, vibrates, or a combination thereof the decoy during use. The vibrator may be connected to a decoy above water, below water, or a combination of both. The vibrator may be connected to the decoy in the front, back, middle, or a combination thereof. The vibrator may be located at any location on the decoy so that the vibrator does not become tangled in the anchor line. The vibrator may be any device that simulates ripples around a decoy so that the decoy appears to be swimming. The vibrator may be any device that moves the decoy up and down so that the decoy appears to be moving, moves, or both. The vibrator may move the decoy from side to side, rotate the decoy around the anchor, or both. The vibrator may include one or more vibration devices that create the vibrations during use.

The vibration devices may be any device that moves the decoy so that an appearance of motion is created. The vibration devices may be a counter weight that rotates producing motion, a weight that translates back and forth producing motion, a weight that translates up and down producing motion, or a combination thereof. The vibration device may be any device that works in temperatures at about 0° C. or less. The vibration device may be of sufficient size so that the vibration device moves the body of the decoy and produces the appearance of movement. The vibration device may be of any size so that the decoy fits within a body portion that is connected to a decoy.

The body of the vibrator may be any device that houses a vibration device, one or more power sources, is water proof, is connectable to a decoy, or a combination thereof. The body of the vibrator may be any device that houses one or more, and preferably all of the internal components of the vibrator so that the internal components are protected from surrounding elements. The body may include one or more sealing features that form a seal between the body and an end cap.

The end cap may be any device that connects to the body and forms a sealed connection with the body. The end cap may be threaded, snap on, fastened, or a combination thereof to the body. The end cap and body may be made of any material that is water proof, is sufficiently rigid so that the vibrator vibrates a decoy, sufficiently malleable so that the vibrator is resistant to shot from a gun, or a combination thereof. The end cap and body may be made of plastic, a polymer, a natural material, a synthetic material, delrin, Acrylonitrile Butadiene Styrene (ABS), nylon, metal, aluminum, or a combination thereof. The end cap may protect one or more power sources that are retained within the body.

The one or more power sources may be any power source that moves a vibration device so that the vibrator is moved. The one or more power sources may be a battery, a solar panel, a capacitor, a kinetic generating and/or storage device, an automatic generating and/or storage device, or a combination thereof. The one or more power sources may be any power source that may work in a temperature below 0° C. Preferably, the one or more power sources may be one or more batteries. The one or more vibrators may be part of a propulsion system.

The propulsion system may function to move the decoy. The propulsion system may function to turn the decoy. The vibrators, the propulsion system, or both may be controlled by remote control. The propulsion system may function to create ripples, waves, or both. The propulsion system may include an impeller, propeller, air mover, water mover, or a combination thereof so that the decoy moves. The propulsion system may move the decoy in forward, reverse, or both. The propulsion system may have a left half and a right half. The left half and right half may be used together so that the decoy moves in a straight line. The left half and right half may be used separately to turn the decoy. The propulsion system may be connected to the power sources. The propulsion system may be connected to a bottom of the decoy at a connection site.

The connection site may be the same connection site as the vibrator. The connection site may function to be interchangeable for one or more functional devices (e.g., vibrator, propulsion, rudder, or a combination thereof). The connection site may be interchangeable so that the vibrator, propulsion system, or both may be connected. The connection site may be a snap fit, a rotation fit, a fastener, or a combination thereof. The connection site may be located so that the keels are locked in a retracted position, a deployed position, or both. The connection site may be located between keels. The one or more connection site may be offset, located in the front, the back, or both so that the propulsion system a movable weight, or both may cause the decoy to dive, tip, move, swim, rotate, or a combination thereof.

The decoy may include a pull over. The pull over may function to break up the body of the decoy, provide movable parts to the decoy, provide feathers to the decoy, prevent glare from the decoy, or a combination thereof. The pull over may include feathers. The pull over may add feathers to a predetermined portion of the decoy. The pull over may be a material that holds feathers so that the feathers are provided over the decoy. The pull over may mirror the shape of the decoy. The pull over may be elastic and conform to the shape of the decoy. The pull over may have enough force so that the pull over remains on the decoy in wind and waves. The pull over may have feathers that are movable during deployment. The pull over may allow function of the crank when the pull over is deployed on the decoy. The feathers of the pull over may be synthetic, real feathers, or both. The feathers may be added to the pull over at after the pull over is added to the decoy.

The decoy may be part of a kit. The kit may include a body, one or more keels, one or more heads and preferably two or more changeable heads, an anchor device, an anchor, anchor line, a vibrator, or a combination thereof. The kit may include a body and the part of the decoy may be separate from the kit. The kit may include a plurality of heads so that the decoy may be customized by changing heads. The kit may be free of a vibrator, removable keels, removable heads, or a combination thereof.

The vibrator, anchor device, keels, heads, or a combination thereof may be used in a method. The method may include one or more steps taught herein performed in virtually any order. The method may include one or more deployment steps. The one or more deployment steps may include a step of turning on a vibrator, connecting the vibrator to the decoy, or both. The vibrator may be turned on by a switch, closing the end cap, or both. The vibrator may be connected to the decoy. The head of the decoy may be loosened, rotated, tightened, or a combination thereof. The crank may be moved in a loosening direction. The crank may be loosened until the spool is moved a sufficient distance that the lock device is free of contact with the spool so that the spool is free spun by the weight of the anchor, the anchor line free spins the anchor, or both. The crank may be tightened so that a desired amount of anchor line is deployed and the decoy is retained in a deployed location by the anchor. The crank may rotated in a retraction direction so that the anchor is retracted, the anchor line is stored, or both. The one or more keels may be removed from a keel recess so that the keels are located below the decoy. The one or more keels may be moved from the bottom of the decoy to a deployed state, moved into the bottom of the decoy into a stored state, or both. The one or more keels may be locked to the bottom of the decoy, unlocked from the bottom of the decoy, or both. The head may be moved to a plurality of positions. The head may be moved and locked in a plurality of positions. One or more heads may be interchanged. A head may be removed and a different head placed on the decoy. The heads may be tightened, loosened, or both.

FIG. 1 illustrates a perspective view of a decoy 2. The decoy 2 includes a head 26 connected to a body 10. The head 26 includes a head locking member 32 and the body 10 includes a body locking member 22 so that the head is movable and lockable in virtually any position. The decoy 2 includes a front 12, a back 14, a top 16, and a bottom 18. The head 26 is located on a top 16 of the decoy 2, a vibrator 90 is connected to a bottom 19 and an anchor 64 extends from a front 12 of the decoy 2. The top 16 of the decoy includes a cover 20 that is retained on the body 10 via the head 26 and a crank 42 that is connected to an anchor device (not shown).

Figure 2:
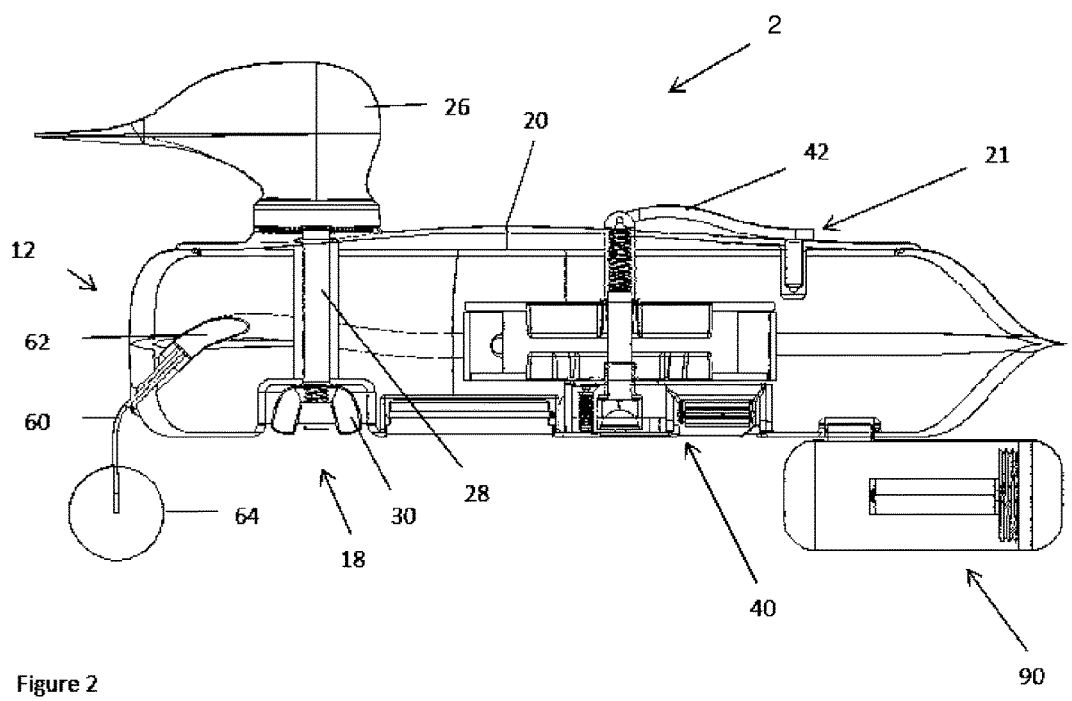
FIG. 2 illustrates a cross-sectional view of FIG. 1 along line 2-2.

FIG. 2 illustrates a cross-sectional view of the decoy 2 of FIG. 1 along line 2-2. A head locking device 28 extends from the head 26 through the cover 20 and connects to a head fastening device 30 on the bottom 18 of the decoy 2 so that the cover 20 and head 26 are connected. An anchor 64 and associated anchor line 60 extend out of a front of the decoy 2 with the anchor line 60 extending through an anchor line guide 62 extending through an inside of the decoy 2. An anchor device 40 is located inside of the decoy 2 with a crank 42 extending above the cover 20. The cover 20 includes a crank recess 21 for receiving a portion of the crank so that the crank 42 is low profile and assists in locking the crank 42 in a position during use and non-use to prevent rotation of the crank 42. The vibrator 90 is illustrated connected to the bottom 18 of the decoy 2.

Figure 3:
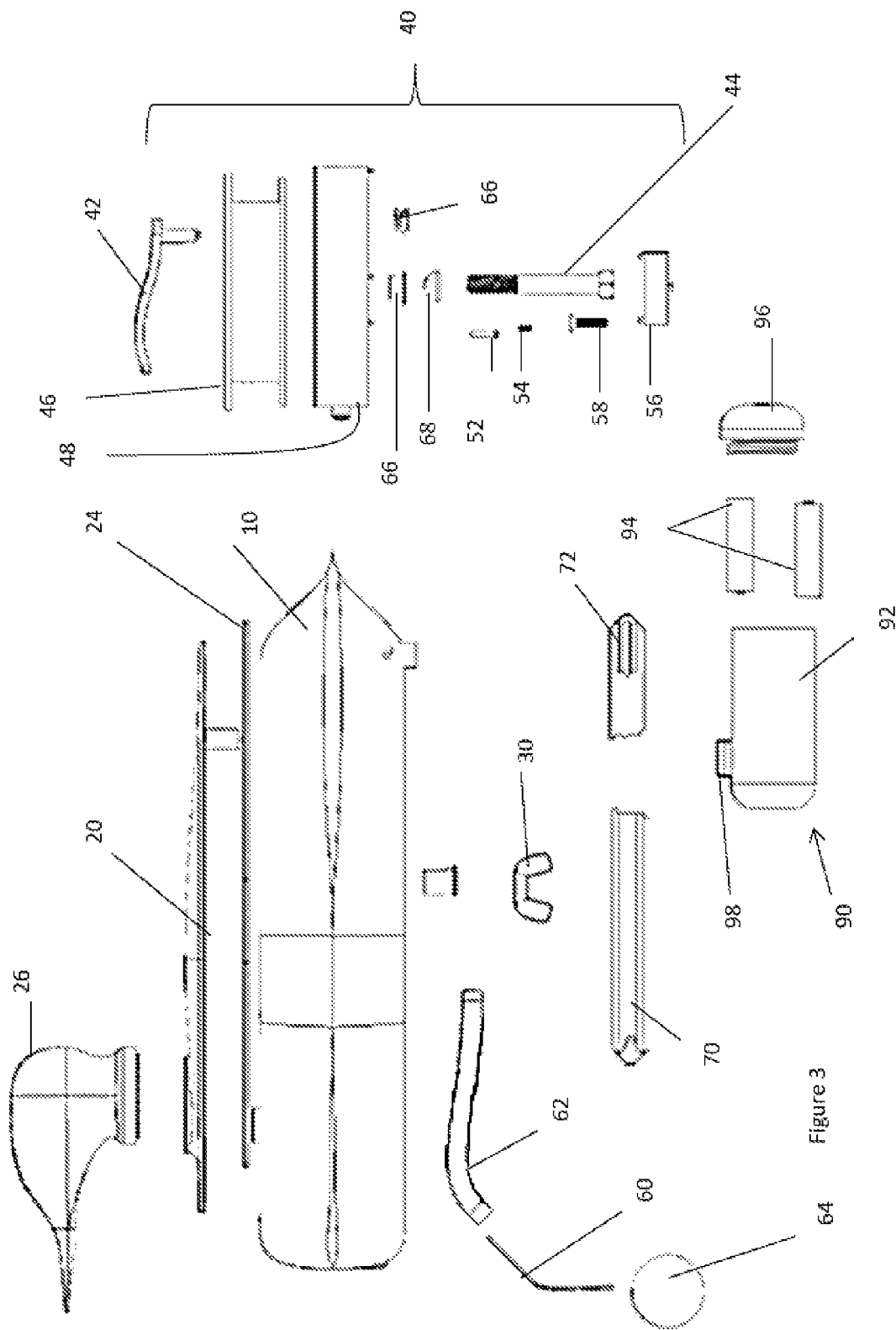
FIG. 3 is an exploded view of one embodiment of the decoy.

FIG. 3 is an exploded view of an example of a decoy. The body 10 includes a cover 20 that is sealed to the body 10 by a seal 24 when the head 26 is attached to the cover 20 by the head fastening device 30. A port keel 70 and a starboard keel 72 are illustrated in a stored position and are movable down during use to assist in controlling movement of the decoy. The vibrator 90 is exploded so that an end cap 96 and power sources 94 are removed from a body 92 that connects the vibrator 90 to the decoy body 10 by a vibrator fastener 98. An anchor device 40 is exploded and separate from the anchor 64, anchor line 60, and anchor line guide 62 that connect the anchor 64 to the anchor device 40 so that the anchor device 40 can be used to raise and lower the anchor 64. The anchor device 40 includes a crank 42 that is connected to a spool 46. The spool 46 is located within a spool cover 48 and the anchor line 60 extends through the anchor line guide, 62 and the spool cover 48 so that the anchor line 60 is wound and unwound around the spool 46 during deployment and retraction of the anchor 64. The crank 42 is connected to the spool 46 by a fastener 44 that extends through the spool 46. A pair of spacers 66 are placed on the fastener 44 so that the crank 42 and locking member 56 are properly spaced apart. An anti-rotation device 68 is connected to a bottom of the fastener 44 so that the fastener is prevented from rotating during rotation of the crank 42. A locking member fastener 58 extends through the locking member 56 so that the locking member is connected to the body 10 and is prevented from moving during rotation of the crank 42. A bias member 54 extends over a lock device 52 and the lock device 52 and bias member 54 are located between the spool 46 and locking member 56 so that a gap is formed between the spool 46 and locking member 56 during rotation of the crank 42 the lock device 52 is removed from contact with the spool 46 so that the spool 46 is allowed to free spin such that the anchor 64 is rapidly deployed.

Figure 4:
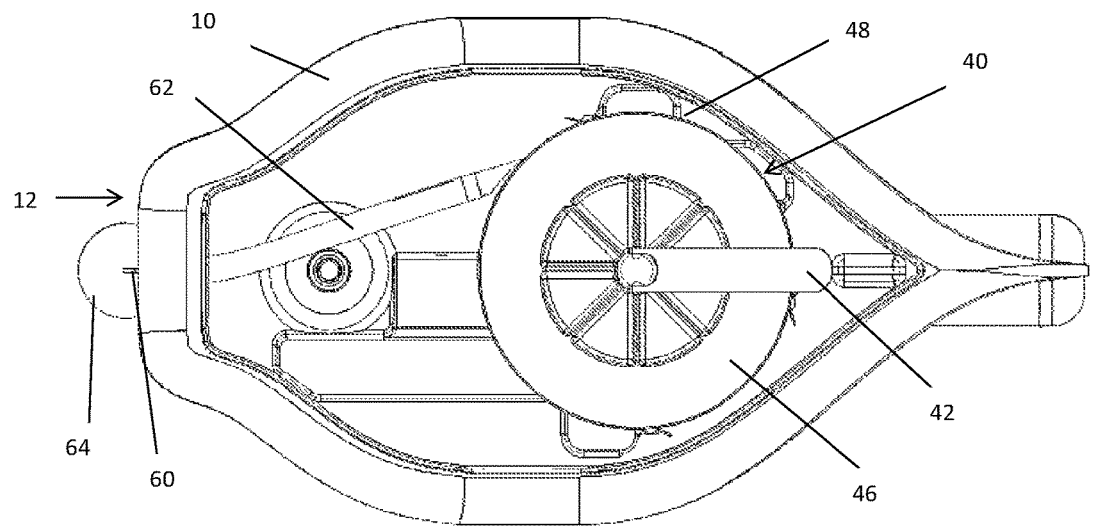
FIG. 4 illustrates a top view of a decoy with a cover removed.

FIG. 4 illustrates a top view of the decoy 2 with the cover removed. The anchor 64 extends from the front 12 of the body 10 and the anchor line 60 extends through an anchor line guide 62 towards the anchor device 40 and through the spool cover 48 so that the anchor is connected to the spool 46 such that as the crank 42 is used to rotate the spool 46 the anchor 64 is raised or lowered.

Figure 5:
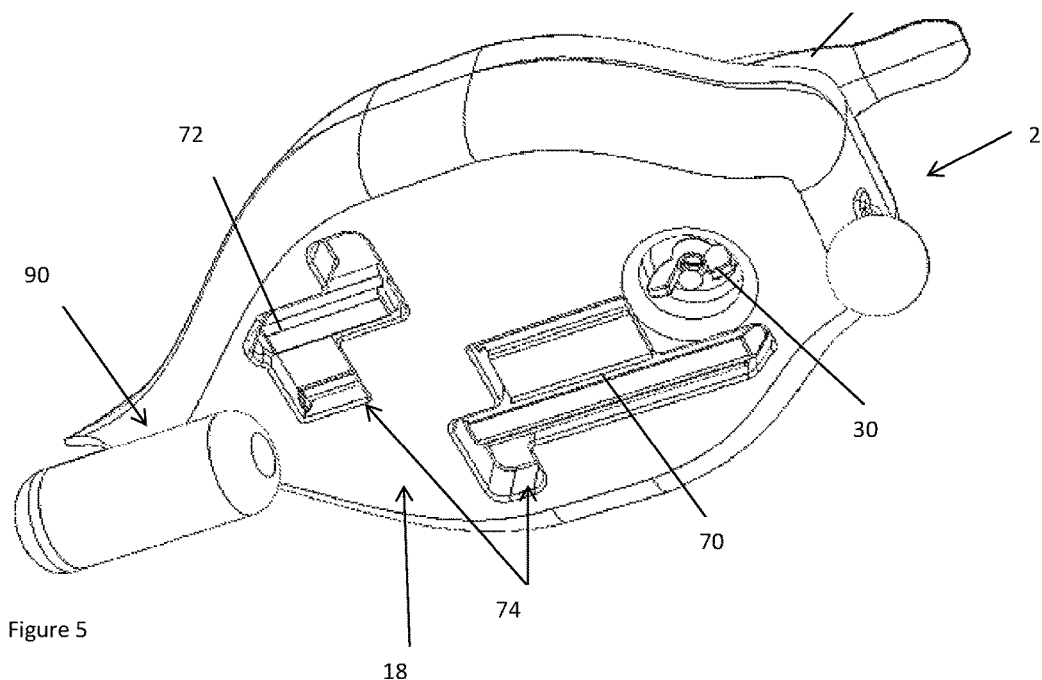
FIG. 5 illustrates a bottom view of a decoy.

FIG. 5 illustrates a bottom view 18 of the decoy 2. The bottom 18 includes a head fastening device 30 that connects the head 26 to the decoy 2. The bottom 18 includes two keel recesses 74. One keel recess 74 includes a port keel 70 and the other keel recess 74 includes a starboard keel 72. The vibrator 90 is connected to the bottom 18 and located behind the port keel 70 and starboard keel 72.

Figure 6:
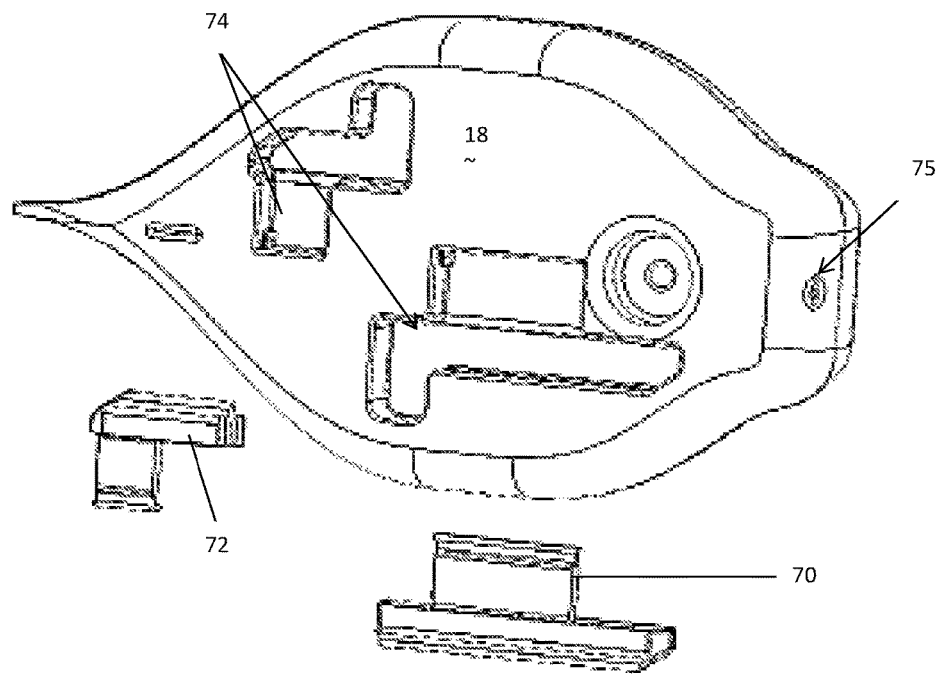
FIG. 6 is an exploded bottom view an embodiment of a decoy.

FIG. 6 illustrates an exploded view of one example of elements on a bottom 18 of the decoy. The bottom 18 includes keel recesses 74 with the port keel 70 and starboard keel 72 removed from the recesses. An anchor port 75 is illustrated in the decoy so that the anchor line (not shown) extends into and out of the decoy.

Figure 7:
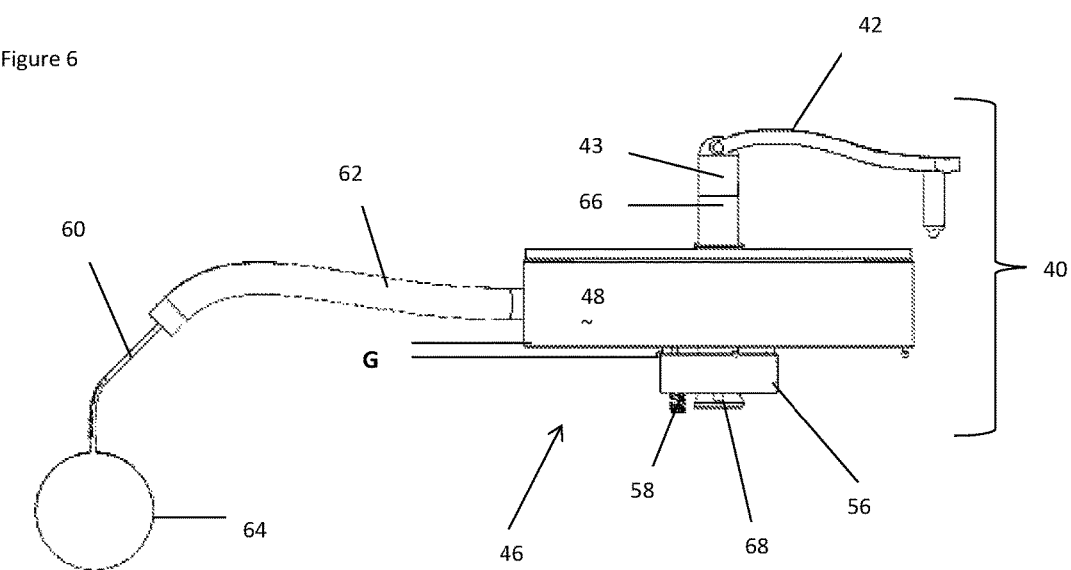
FIG. 7 illustrates an example of an anchor device connected to an anchor.

FIG. 7 illustrates an example of an anchor device 40. The crank 42 is connected to a spool 46 by a crank cap 43. A spacer 66 separates the crank cap 43 from the spool 46. The spool 46 is covered by a spool cover 48. The spool 46 is separated from the locking member 56 by a gap (G). An anti-rotation device 68 extends from a bottom of the locking member 56 so that a fastener 44 (not shown) is prevented from rotating during rotation of the crank 42. A locking member fastener 58 extends through the bottom of the locking member 56 so that the locking member 56 is prevented from rotating during rotation of the fastener 44 (not shown). The spool cover 48 includes a hole so that an anchor line 60 extends from the anchor line guide 62 and through the spool cover 48 to the spool 46 so that the spool is used to raise and lower the anchor 64.

Figure 8A:
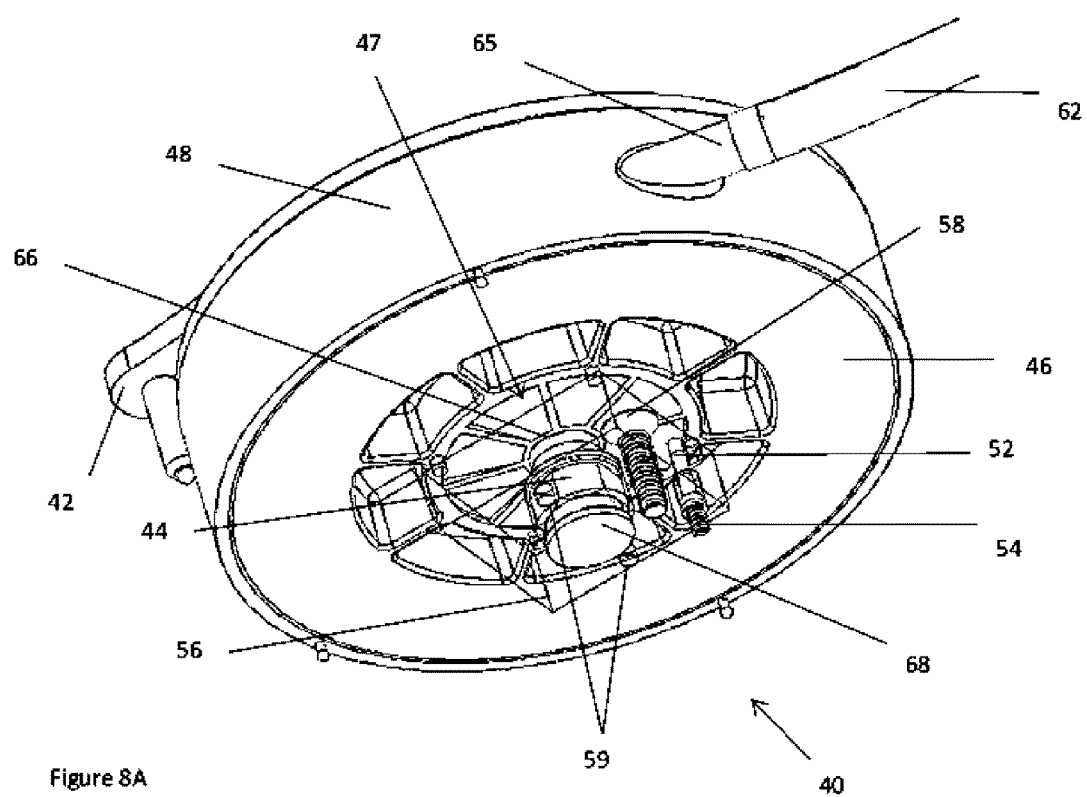
FIG. 8A is a bottom perspective view of an anchor device

FIG. 8A illustrates a bottom perspective view of an anchor device 40. The anchor device includes a crank 42 that is connected to a fastener 44. The fastener 44 extends through a spool 46 that is surrounded by a spool cover 48 into a locking member 56, The locking member 56 as illustrated is transparent so that the relationship of the adjoining components is visible. The fastener 44 extends into the locking member 56 and into contact with an anti-rotation device 68 that is retained between the locking member 56 and the bottom of the decoy (not shown) so that the fastener 44 is prevented from rotating. A locking member fastener 58 extends through the locking member 56 and connects the locking member to the decoy (not shown) so that the locking member is prevented from moving. The locking member fastener 58 works in conjunction with pegs 59 that extend from the locking member 56 into recesses (not shown) in the decoy (not shown) to assist in preventing rotation of the locking member 56. A spacer 66 is over the fastener 44 and located between the locking member 56 and the spool 46 so that when the crank is tightened on the fastener a minimum gap is retained between the spool 46 and the locking member 56 as is illustrate in FIG. 7. A through hole extends all of the way though the locking member 56 that receives a lock device 52 that rests on a bias member 54 so that when a minimum gap is present the bias member moves the lock device 52 into a spool recess 47 so that the lock device 52 prevents movement of the spool 46. The spool cover 48 includes an exit port 68 that is connected to an anchor line guide 62 so that anchor line (not shown) can enter and exit the anchor device 40.

Figure 8B:
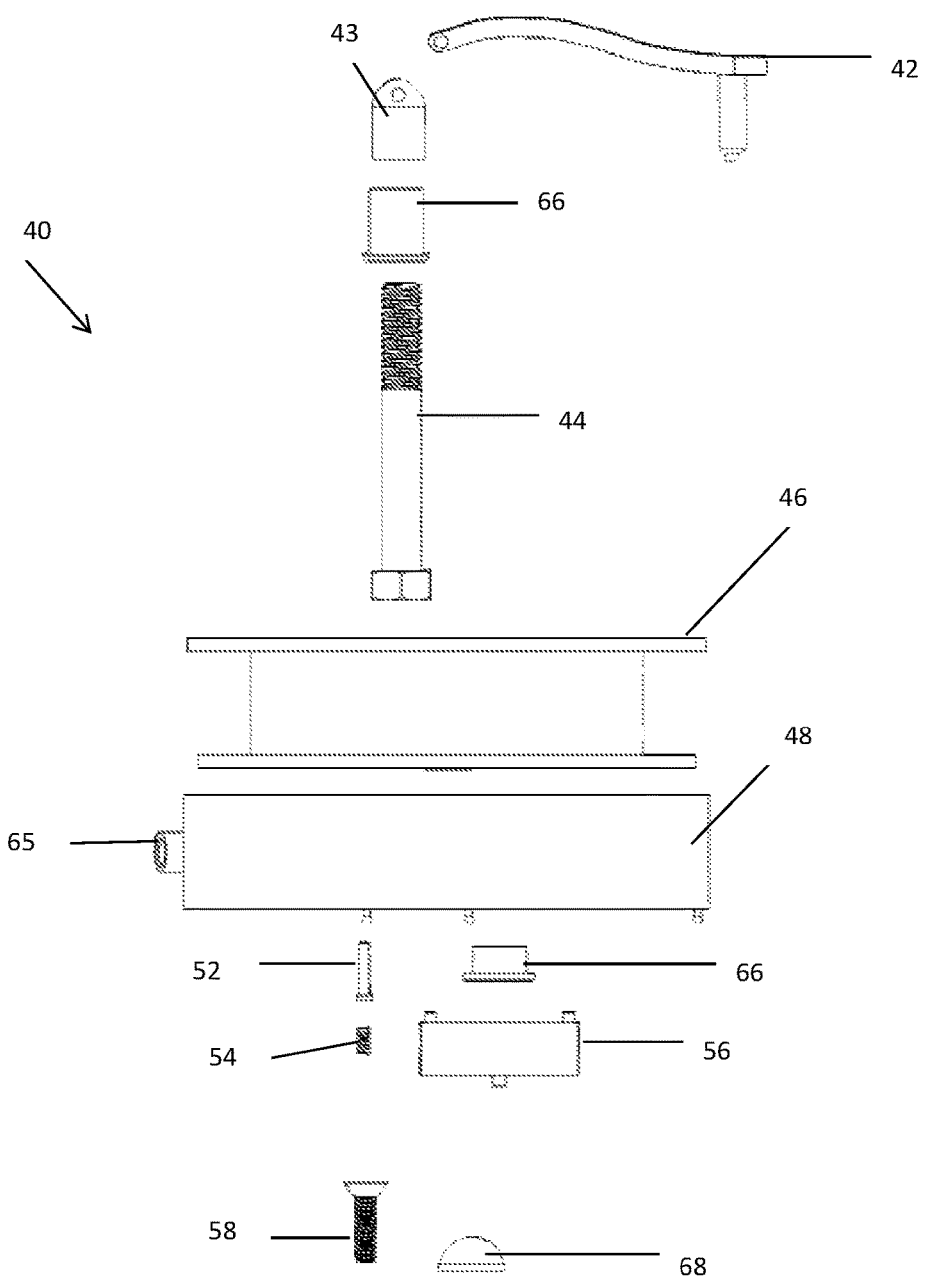
FIG. 8B is an exploded view of an anchor device.

FIG. 8B illustrates an exploded view of an anchor device 40. The anchor device includes a crank 42 that is connected to a crank cap 43 having threads that receive and connect the crank 42 to a threaded fastener 44. The fastener 44 extends through a locking member 56 and a spool 46 and includes a pair of spacers 66 so that the crank 42 and spool 46 and spool 46 and locking member 56 are spaced apart a predetermined distance. A spool cover 48 covers that spool 46 and includes an exit port 65 so that an anchor line (not shown) extends out of the spool cover 48. An anti-rotation device 68 is located below a fastener 44 so that the fastener 44 is prevented from rotating with the crank 42 such that the crank 42 unthreads the crank cap 43 from the fastener 44 and a gap between the spool 46 and locking member 56 is increased by a bias member 54 located over a lock device 52 so that the lock device 52 is released from contact with the spool 46 allowing for free rotation of the spool 46. The locking member 56 is locked in place by a locking member fastener 58 so that the locking member 56 is prevented from rotating.

Figure 9:
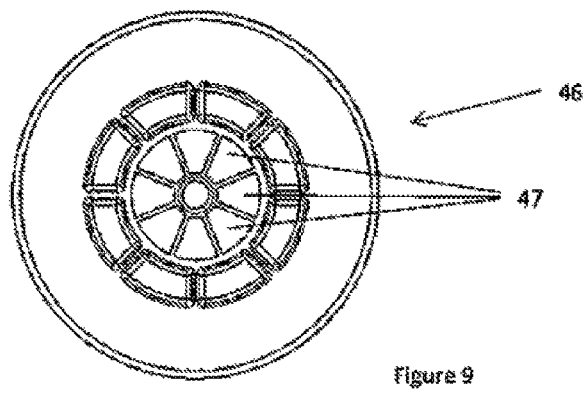
FIG. 9 is a bottom view of a spool.

FIG. 9 illustrates a bottom view of a spool 46. The spool 46 includes a plurality of recesses 47 for receiving the lock device (not shown) so that the spool is prevented from moving when the lock device extends into a recess 47.

Figure 10:
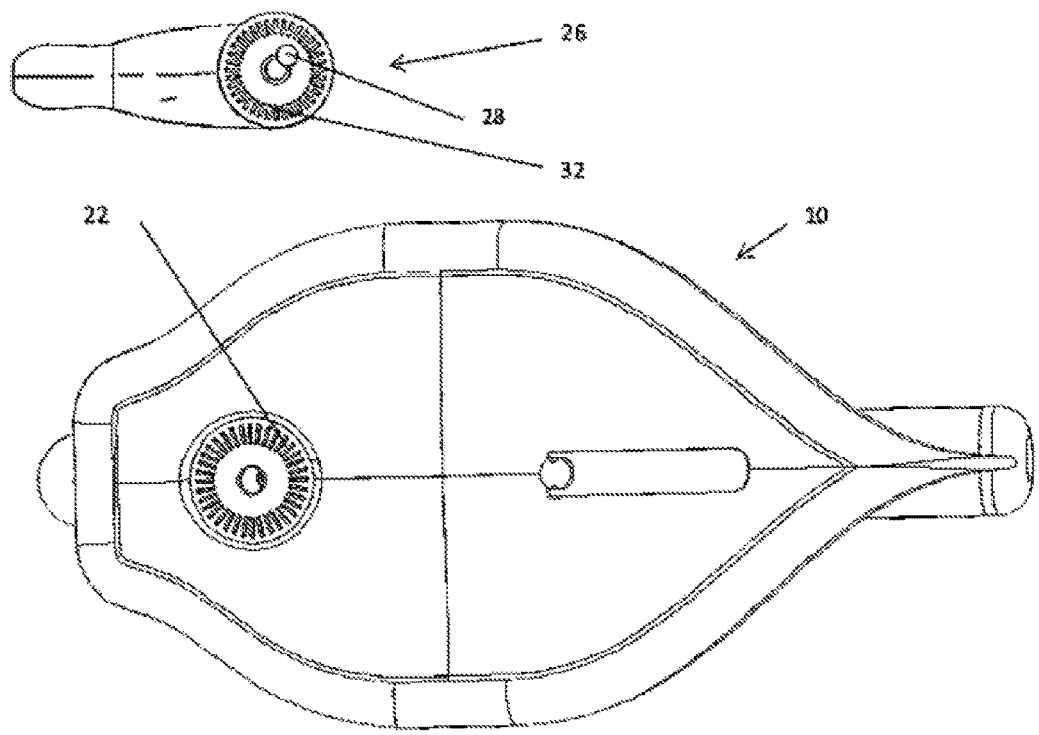
FIG. 10 is a view of a top of the decoy and a bottom view of a head removed from the decoy.

FIG. 10 illustrates the head 26 removed from the body 10 so that the cover locking member 22 and head locking member 32 are exposed. The head locking device 28 extends into the body 10 and when the head locking device 28 is loosened the head 26 is rotatable and when the head locking device 30 is tightened a complementary fit is formed between the head locking member 32 and cover locking member 22 preventing further rotation of the head 26.

Figure 11:
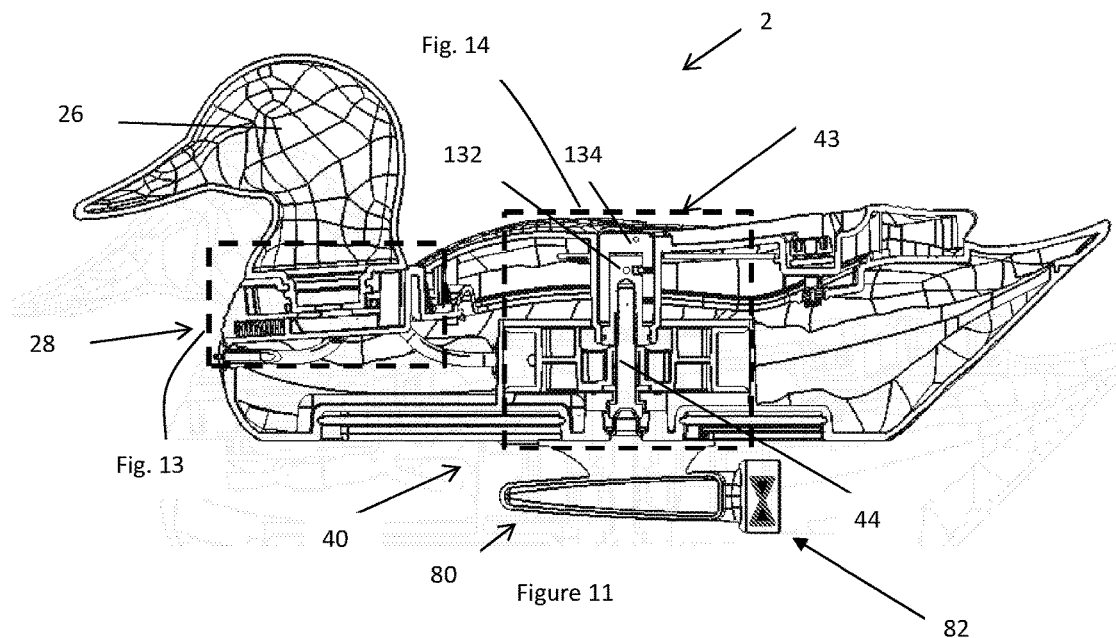
FIG. 11 illustrates a cross-sectional view of a decoy.

FIG. 11 illustrates a cross-sectional view of a decoy 2. The decoy 2 includes a head 26 connected by a head locking device 28. An anchor device 40 is located within the decoy 2. The anchor device 40 includes a crank cap 43 that has a connection portion 130 and a sliding portion 132. A propulsion system 80 is located on the bottom of the decoy 2 for moving the decoy 2. The propulsion system 80 as shown includes a propeller 82.

Figure 12:
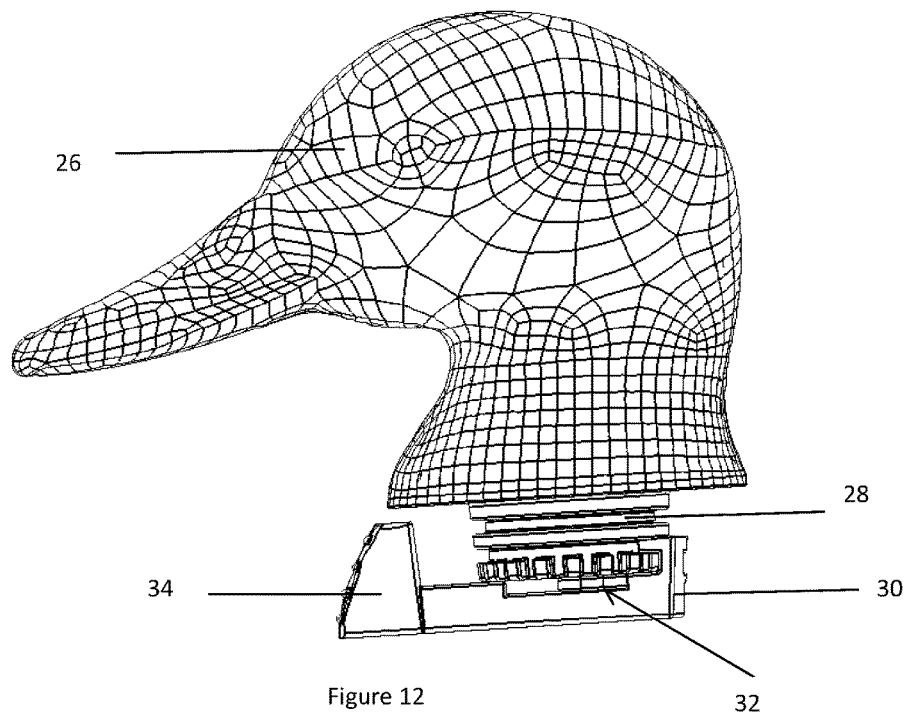
FIG. 12 illustrates a side view of a head of a decoy.

FIG. 12 is a side view of a head 26 and connection device. The connection device includes a head locking feature 28 extending from the head 26. The head locking feature 28 forms a connection with a head fastening device 30 that is moved by depressing an actuator 34 so that the head locking feature 28 is released and the head 26 can be removed. A head locking member 32 assists in preventing rotation of the head 26 once the head 26 is locked in place.

Figure 13:
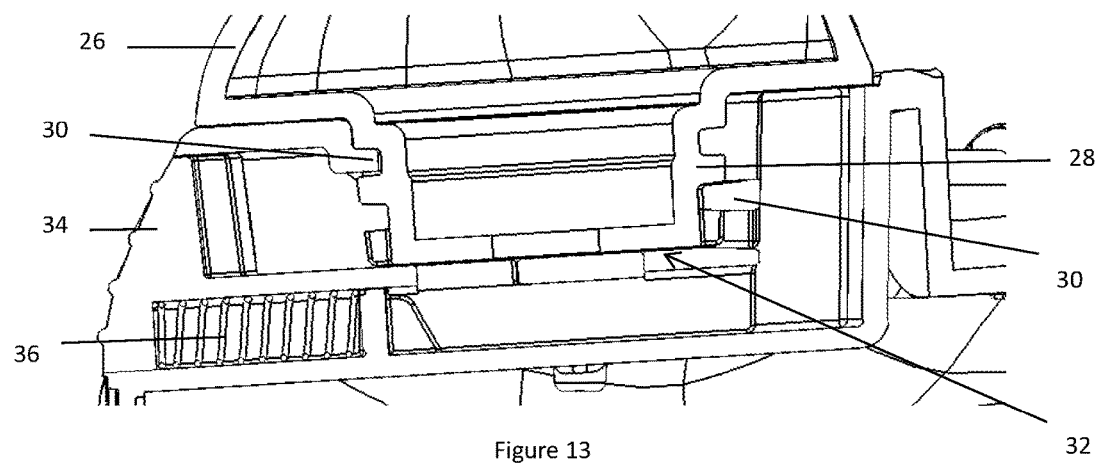
FIG. 13 illustrates a cross-sectional view of a head and connection device.

FIG. 13 illustrates a close-up view of the head 26 and head locking device 28 of FIG. 11. The head locking device 28 is locked in the decoy by a pair of opposing head fastening devices 30 that extend over a portion of the head locking device 28. An actuator 34 when moved spreads the head fastening device 30 apart so that the head locking device 28 is released. The actuator 34 is moved to a locked position by a return device 36. The head 26 is prevented from rotating by a head locking member 32.

Figure 14:
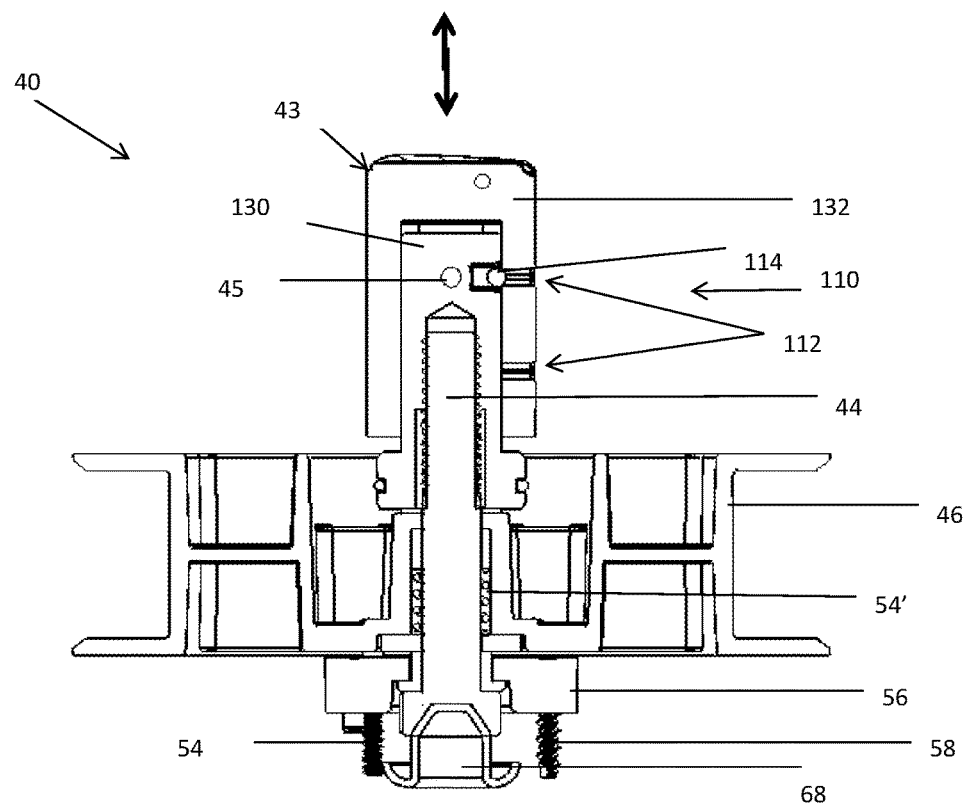
FIG. 14 illustrates a cross-sectional view of an anchor device.

FIG. 14 illustrates a cross-sectional view of the anchor device 40 of FIG. 11, The anchor device 40 includes a crank cap 43 that includes a connection portion 130 and a sliding portion 132. The connection portion 130 has a movable connection with a fastener 44. The sliding portion 132 slides up and down in the direction of the arrows between a stored position and a working position/retraction position. The sliding portion 132 and connection portion 130 include a positioning feature 110. The positioning feature 110 includes a pair of static members 112 that lock the crank cap 43 in a stored position or a working position/retraction position. A movable member 114 forms a connection with the static member 112 to create resistance when the movable member 114 fits into one of the static members 112 so that movement of the crank cap 43 is resisted. A lock device 45 that is configured as a pin extends through the connection portion 130 and the sliding portion 132 so that they are movable connected together. A spool 46 is fitted between the crank cap 43 and the locking member 56 so that movement of the spool 46 is restricted. A bias member 54' is located along the fastener 44 for axially spacing the spool 46 from the locking member 56. An anti-rotation device 68 is in communication with the base of the fastener 44 to prevent rotation of the fastener. A locking member fastener 58 extends from the locking member 56 to connect the locking member 56 to the decoy. A bias member 54 extends partially through the locking member 56 to move a lock device 52 (not shown) into contact with the spool 46 to prevent rotation.

Figure 15:
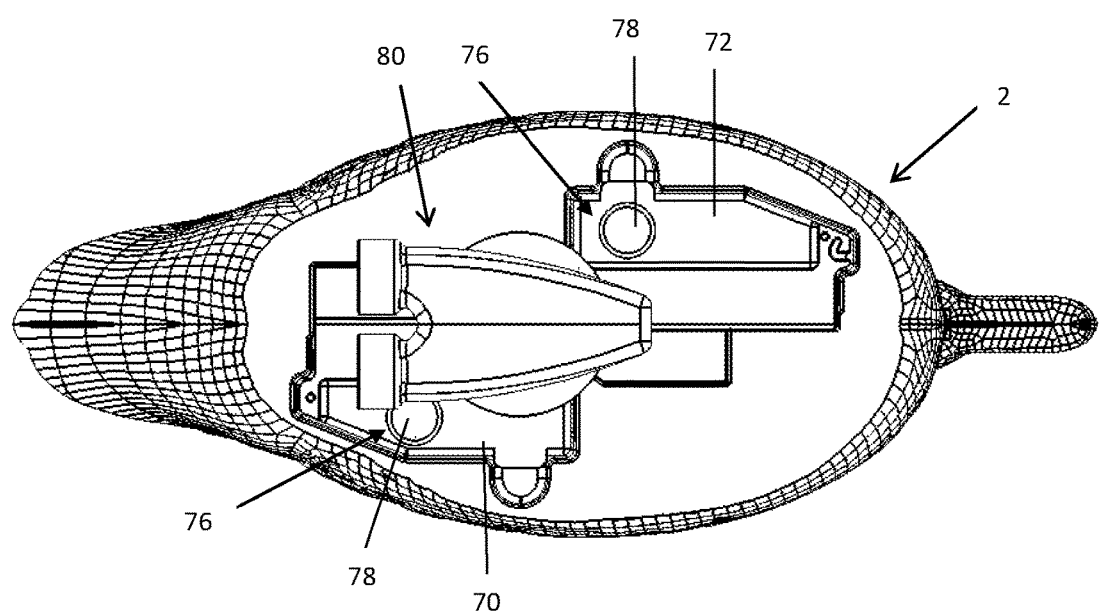
FIG. 15 illustrates a bottom view of a decoy including a propulsion system.
Figure 16A:
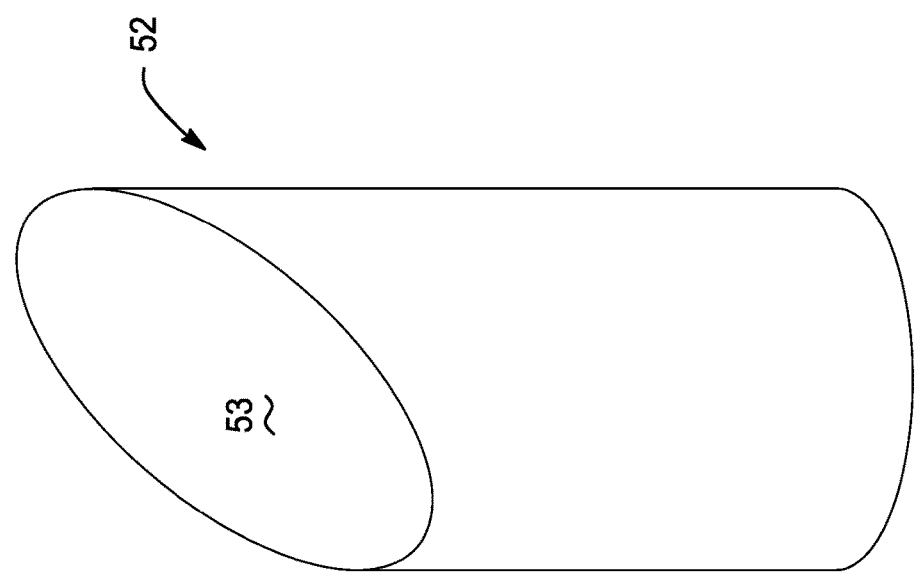
FIG. 16A illustrates a lock device 52 including an angled edge 53.
Figure 16B:
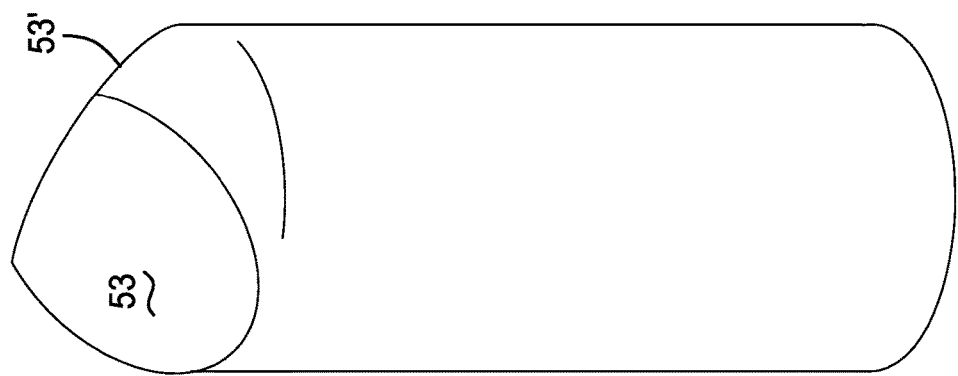
FIG. 16B illustrates a lock device 52 including two angled edges shown as a first angled edge 53 and a second angled edge 53'.
Figure 17:
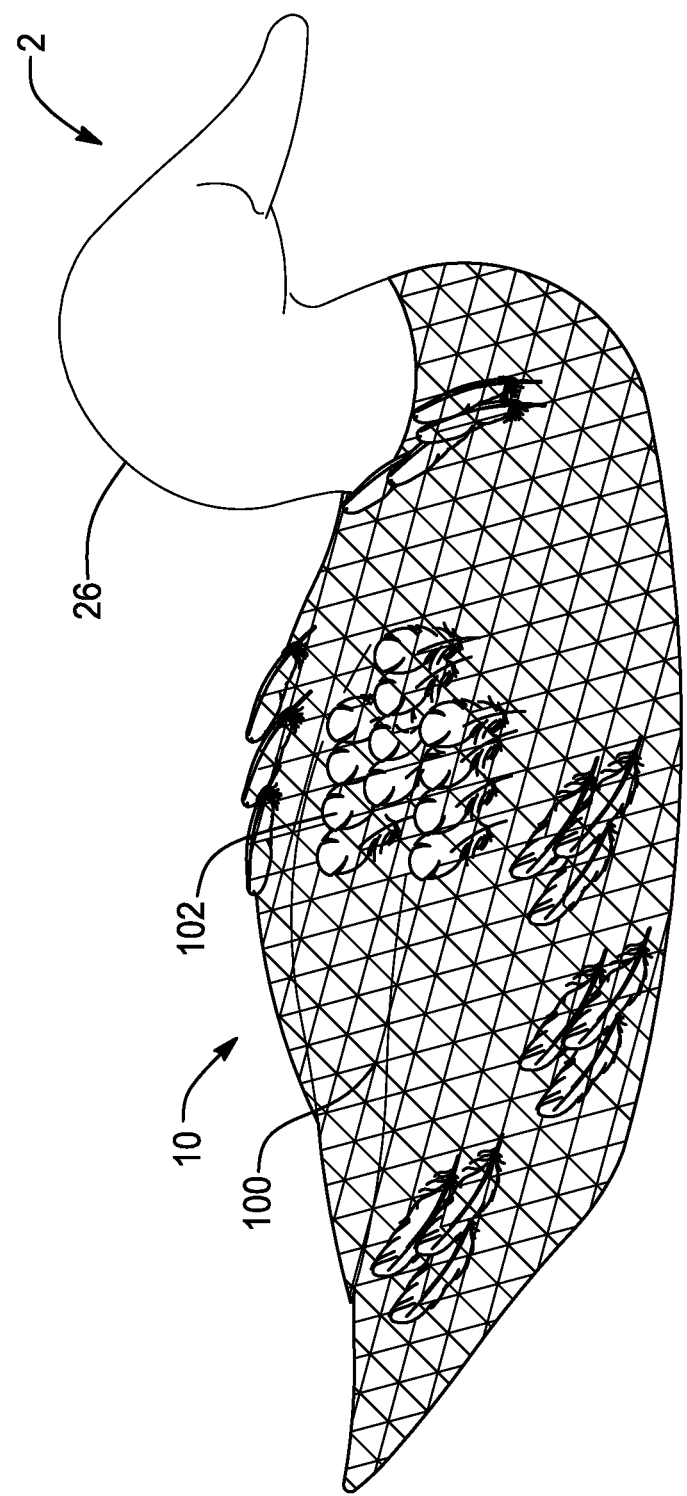
FIG. 17 illustrates a decoy 2 having a head 26 and a body 10. The body 10 is covered by a pull over 100 that includes feathers 102.

FIG. 15 illustrates a bottom view of a decoy 2 including a propulsion system 80. The propulsion system 80 covers a portion of the port keel 70 and the starboard keel 72 so that the keels are locked in place by the propulsion system 80.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

I claim:
1. A decoy comprising:
   a. an anchor device comprising:
      i. a crank;
      ii. a spool connected to the crank, the spool being axially movable along a rotational axis of the spool;
      iii. a plurality of spool recesses within the spool;
      iv. a locking member located proximate to the spool, and
      iv. a bias member located between the locking member and the spool that creates a gap between the spool and the locking member when the crank is moved in a first direction and the gap being reduced when the crank is moved in a second direction;
      wherein the gap separates the spool and the locking member and the gap is sufficiently large so that the spool is free to rotate relative to the locking member when the spool axially moves along the rotational axis of the spool in the first direction to a deployment position and the spool axially moves along the rotational axis in the second direction to a locked position where the gap is sufficiently small so that the spool is prevented from rotating by the locking member;
   b. an anchor; and
   c. an anchor line connecting the anchor to the spool so that the spool in the locked position assists in retracting the anchor and in the deployment position allows the anchor to deploy.

2. The decoy of claim 1, wherein the locking member includes a lock device and the lock device extends into one of the spool recesses so that rotation of the spool is prevented by the lock device when the spool is in the locked position.

3. The decoy of claim 2, wherein a second bias member is located under the lock device so that the lock device axially moves as a size of the gap changes from the locked position to the deployment position.

4. The decoy of claim 3, wherein the gap in the deployment position is large enough so that the second bias member cannot move the lock device into one of the plurality of spool recesses to prevent movement of the spool.

5. The decoy of claim 2, wherein the lock device is planar, includes one angled edge, includes two angled edges, or a combination thereof, and the crank is a foldable crank.

6. The decoy of claim 1, wherein the crank is threaded on a fastener via a crank cap and the fastener connects the crank to the spool so that the crank when rotated retracts the anchor, and an anti-rotation device is located at an end of the fastener opposite the crank and the anti-rotation device prevents rotation of the fastener with the crank.

7. The decoy of claim 6, wherein the fastener extends through the spool and the spool is axially moved along the fastener towards the deployment position by the bias member as the crank is moved.

8. The decoy of claim 1, wherein a body has a hollow recess that houses the anchor device and the anchor and anchor line extend through an exit port in the body, and the exit port in the body includes an anchor line guide that guides the anchor line in and out of the hollow recess.

9. The decoy of claim 1, wherein the decoy includes a pull over that includes feathers and the pull over adds feathers to a predetermined portion of the decoy.

10. A decoy comprising:
   a. an anchor device comprising:
      i. a crank;
      ii. a spool connected to the crank, the spool having a rotational axis and being movable axially along the rotational axis;
      iii. a plurality of spool recesses within the spool;
      iv. a locking member located proximate to the spool, v. a lock device at least partially located within the locking member, wherein a gap separates the spool and the lock device when the spool is in a deployment position so that the spool is free to rotate relative to the lock device, and the gap in a locked position is sufficiently small so that the spool is prevented from rotating by the lock device extending into one of the plurality of spool recesses; and vi. a bias member located between the locking member and the spool, the bias member creating the gap between the spool and the locking member when the crank is moved in a first direction to the deployment position and the gap being reduced when the crank is moved in a second direction towards the locked position;

b. an anchor;

c. an anchor line connecting the anchor to the spool so that the spool in the locked position assists in retracting the anchor and in the deployment position allows the anchor to deploy; and d. one or more collapsible keels located on a bottom of the decoy so that during use the one or more collapsible keels during use are extended below the decoy and during storage the one or more collapsible keels are collapsed into a keel recess so that the one or more collapsible keels are substantially planar with the bottom of the decoy.

11. The decoy of claim 10, wherein a second bias member is located under the lock device so that the lock device axially moves as a size of the gap changes as the spool moves from the locked position to the deployment position.

12. The decoy of claim 10, wherein the crank is threaded on a fastener via a crank cap and the fastener connects the crank to the spool so that the crank when rotated retracts the anchor, and
wherein an anti-rotation device is located at an end of the fastener opposite the crank and the anti-rotation device prevents rotation of the fastener with the crank cap.

13. The decoy of claim 10, wherein the decoy includes a body and the body has a hollow recess that houses the anchor device and the anchor and anchor line extend through an exit port in the body, the exit port in the body includes an anchor line guide that guides the anchor line in and out of the hollow recess, and the one or more collapsible keels are a port keel and a starboard keel and the port keel folds towards a first side of the decoy and the starboard keel folds towards a second side of the decoy that is opposite the first side.

14. The decoy of claim 13, wherein the one or more collapsible keels are connected to the decoy on one end and the one or more collapsible keels rotate around the connection so that the one or more collapsible keels are deployed and/or stored, and the connection is two or more unitary pins that extend from a portion of the one or more collapsible keels.

15. The decoy of claim 13, wherein the one or more collapsible keels are connected to the decoy on one end of the one or more collapsible keels and the one or more collapsible keels rotate around the connection so that the one or more collapsible keels are deployed and/or stored, and the connection is a rod that extends through the one end of the one or more collapsible keels.

16. The decoy of claim 10, wherein the decoy includes a propulsion system that moves the decoy; the propulsion system includes an impeller, propeller, air mover, water mover, or a combination thereof that moves the decoy; and the propulsion system being removably attached to a connection site on a bottom of the decoy.

17. The decoy of claim 10, wherein the lock device includes one angled edge and the one angled edge assists in moving the lock device downward so that the lock device is movable from one of the plurality of spool recesses to a subsequent spool recess of the plurality of spool recesses during rotation of the spool.

18. The decoy of claim 10, wherein the decoy includes a pull over that includes feathers and the pull over adds feathers to a predetermined portion of the decoy.

19. A decoy comprising:

a. a body having a recess;

b. a cover covering the recess in the body so that the decoy is substantially fluid resistant, wherein the cover includes a cover locking member;

c. an anchor device located in the recess, the anchor device comprising:

i. a crank;

ii. a spool connected to the crank;

iii. a plurality of spool recesses located within the spool;

iv. a locking member located proximate to the spool, v. a lock device at least partially located within the locking member, vi. a bias member in communication with the lock device so that the bias member biases the lock device towards the spool;

vii. a fastener that is connected to and extends from the crank through the locking member;

viii. a locking member fastener connecting the locking member to the decoy, wherein a gap separates the spool and the lock device when the spool is in a deployment position so that the spool is free to rotate relative to the lock device, and the gap in a locked position is sufficiently small so that the spool is prevented from rotating by the lock device extending into one of the plurality of spool recesses;

d. an anchor;

e. an anchor line connecting the anchor to the spool so that the spool in the locked position assists in retracting the anchor and in the deployment position allows the anchor to deploy;

f. one or more collapsible keels located on a bottom of the decoy so that during use the one or more collapsible keels during use are extended below the decoy and during storage the one or more collapsible keels are collapsed into a keel recess so that the one or more collapsible keels are substantially planar with the bottom of the decoy; and g. a head having a head locking member that is complementary to the cover locking member so that the head is movable to a plurality of positions and the head is lockable in any of the plurality of positions.

20. The decoy of claim 19, wherein the decoy includes a vibrator that vibrates the decoy and causes movement of water around the decoy.

* * * * *